United States Patent
Grayson et al.

(10) Patent No.: US 10,165,608 B2
(45) Date of Patent: Dec. 25, 2018

(54) SYSTEM AND METHOD TO PROVIDE FAST MOBILITY IN A RESIDENTIAL WI-FI NETWORK ENVIRONMENT

(71) Applicant: CISCO TECHNOLOGY, INC., San Jose, CA (US)

(72) Inventors: Mark Grayson, Maidenhead (GB); Ziv Nuss, Tzur Yigal (IL)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/171,126

(22) Filed: Jun. 2, 2016

(65) Prior Publication Data

US 2017/0353983 A1    Dec. 7, 2017

(51) Int. Cl.
| | |
|---|---|
| *H04W 4/00* | (2018.01) |
| *H04W 76/11* | (2018.01) |
| *H04L 29/12* | (2006.01) |
| *H04L 29/06* | (2006.01) |
| *H04W 12/04* | (2009.01) |
| *H04W 12/06* | (2009.01) |
| *H04W 84/12* | (2009.01) |

(52) U.S. Cl.
CPC .......... *H04W 76/11* (2018.02); *H04L 61/203* (2013.01); *H04L 63/06* (2013.01); *H04L 63/0892* (2013.01); *H04W 12/04* (2013.01); *H04W 12/06* (2013.01); *H04W 84/12* (2013.01)

(58) Field of Classification Search
CPC ..... H04W 36/00; H04W 12/04; H04W 12/06; H04L 63/0823; H04L 29/06; H04L 29/08; H04L 63/0492; H04L 63/061

USPC .......................................................... 370/331
See application file for complete search history.

(56) References Cited

U.S. PATENT DOCUMENTS

| | | | |
|---|---|---|---|
| 7,483,409 B2 | 1/2009 | Zheng | |
| 7,813,319 B2 | 10/2010 | Dutta et al. | |
| 8,050,678 B2 * | 11/2011 | Lin | H04L 63/0823 370/331 |
| 8,249,256 B2 | 8/2012 | Korus et al. | |
| 8,270,382 B2 | 9/2012 | Cam-Winget et al. | |
| 8,363,617 B2 * | 1/2013 | Meyer | H04W 48/20 370/331 |
| 2008/0310366 A1 | 12/2008 | Oba et al. | |
| 2009/0210710 A1 | 8/2009 | Zheng et al. | |

(Continued)

OTHER PUBLICATIONS

Barton, Bart, "S1 Interface Based Handover," Tech Blog on 4G/LTE and Beyond, Mar. 24, 2012; 7 pages.

(Continued)

*Primary Examiner* — Hanh N Nguyen
(74) *Attorney, Agent, or Firm* — Patterson + Sheridan, LLP

(57) ABSTRACT

An example method is provided in one example embodiment and may include subscribing to a key distribution service by a plurality of Wi-Fi access points belonging to a same mobility domain; receiving a request from a user equipment to connect to a first Wi-Fi access point of the plurality of Wi-Fi access points belonging to the same mobility domain; determining one or more second Wi-Fi access points of the plurality of Wi-Fi access points belonging to the same mobility domain that neighbor the first Wi-Fi access points; and distributing keying parameters to each of the one or more second Wi-Fi access points. The keying parameters can be associated with 802.11r pairwise master key (PMK) keying parameters.

18 Claims, 11 Drawing Sheets

(56) References Cited

U.S. PATENT DOCUMENTS

| | | | | |
|---|---|---|---|---|
| 2013/0196708 | A1* | 8/2013 | Narasimhan | H04L 9/0827 455/525 |
| 2016/0127903 | A1* | 5/2016 | Lee | H04W 36/00 713/171 |
| 2017/0134940 | A1* | 5/2017 | Sharma | H04W 12/04 |
| 2017/0265070 | A1* | 9/2017 | Patel | H04W 12/06 |

OTHER PUBLICATIONS

Cisco Systems, Inc., "802.11r, 802.11k, and 802.11w Deployment Guide, Cisco IOS-XE Release 3.3," Jan. 25, 2014; 30 pages.
Cisco Systems, Inc., "Call Flows for Simple IP Users," Intelligent Wireless Access Gateway Configuration Guide, Mar. 28, 2014; 10 pages.
Cisco Systems, Inc., "Chapter 13: Configuring RADIUS Servers," Cisco IOS Software Configuration Guide for Cisco Aironet Access Points, May 2010; 30 pages.
Cisco Systems, Inc., "Chapter 3: 802.11 Security Summary," Wireless and Network Security Integration Design Guide, Nov. 24, 2008; 20 pages.
Cisco Systems, Inc., "Chapter 6: Configuring Security Solutions," Cisco Wireless LAN Controller Configuration Guide, May 18, 2010; 130 pages.
Coleman, David D., et al., "CWSP Certified Security Professional Official Study Guide, Exam PWO-204," Sybex, Feb. 15, 2010, 703 pages.
"Fast BSS Transition (FT) or 802.11r," Wireless Learnings, Nov. 12, 2015; 7 pages.
"How to understand TSs—51 Handover with MME and SGW Relocation and Indirect Tunneling," Windancer—Stairway to Heaven? May 6, 2014; 9 pages.
"IEEE 802.11r-2008," from Wikipedia, the free encyclopedia, Nov. 11, 2015; 3 pages.
"Service Set (802.11 Network)," from Wikipedia, the free encyclopedia, Jan. 10, 2016; 3 pages.
"Wireless Specifications: Wi-Fi Provisioning Framework Specification, WR-SP-WiFi-MGMT-I04-140311," Cable Television Laboratories, Mar. 11, 2014; 118 pages.
"Wireless Specifications: Wi-Fi Provisioning Framework Specification, WR-SP-WiFi-MGMT-I05-141201," Cable Television Laboratories, Inc., Dec. 1, 2014; 190 pages.
"Wireless Wi-Fi: Wi-Fi Ration Resource Management (RRM)/Self Organizing Networks (SON) Technical Report, WR-TR-RRM-SON-V01-140926," Cable Television Laboratories, Inc., Sep. 26, 2014; 14 pages.
Calhoun, P., et al., "Control and Provisioning of Wireless Access Points (CAPWAP) Protocol Specification," Network Working Group RFC 5415, Mar. 2009; 155 pages.
Goswami, Subrata, "DIAMETER Application for Mobile-IPv4 and 802.11 Authentication," Internet-Draft, draft-goswami-aaa-mipv4-wlan-auth-01.txt, Oct. 13, 2002; 9 pages.
Cisco Systems, Inc., "Service Provider Wi-Fi Networks: Scaling Signaling Transactions," White Paper, Mar. 2014; 20 pages.
Cisco Systems, Inc., "VoWi-Fi Network Design Guide: Realize a High-Definition Voice Experience (HDVX)," White Paper, Feb. 2016; 5 pages.
Francia, Steve, "REST vs SOAP, the difference between soap and rest," blog posted to spf13.com on Jan. 15, 2010; 6 pages.
Broadband Forum Technical Report: "TR-069; CPE WAN Management Protocol v1.1," Version: Issue 1 Amendment 2; Version Date: Dec. 2007, The Broadband Forum; 138 pages.
Broadband Forum Technical Report: "TR-196; Femto Access Point Service Data Model," Issue: 1, Issue Date: Apr. 2009; The Broadband Forum; 131 pages.
Broadband Forum Data Model Definition: "TR-069 Device: 2.8 Root Object definition tr-181-2-8-0.xml," The Broad Forum, Feb. 16, 2016 version; 398 pages.
"Object (computer science)," from Wikipedia, the free encyclopedia, Feb. 14, 2016, 6 pages.
"Object model," from Wikipedia, the free encyclopedia, Apr. 17, 2015, 3 pages.

* cited by examiner

100

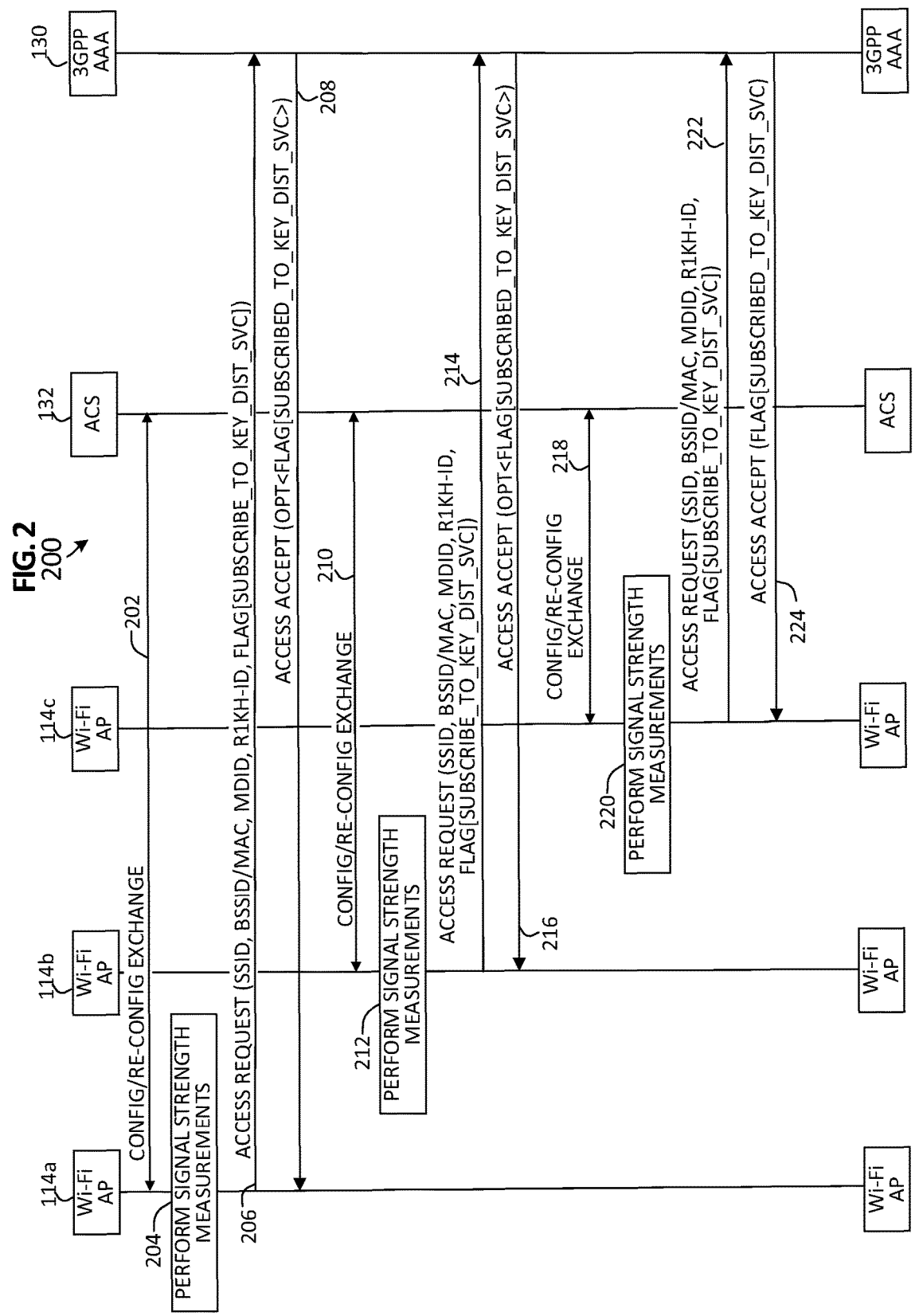

300

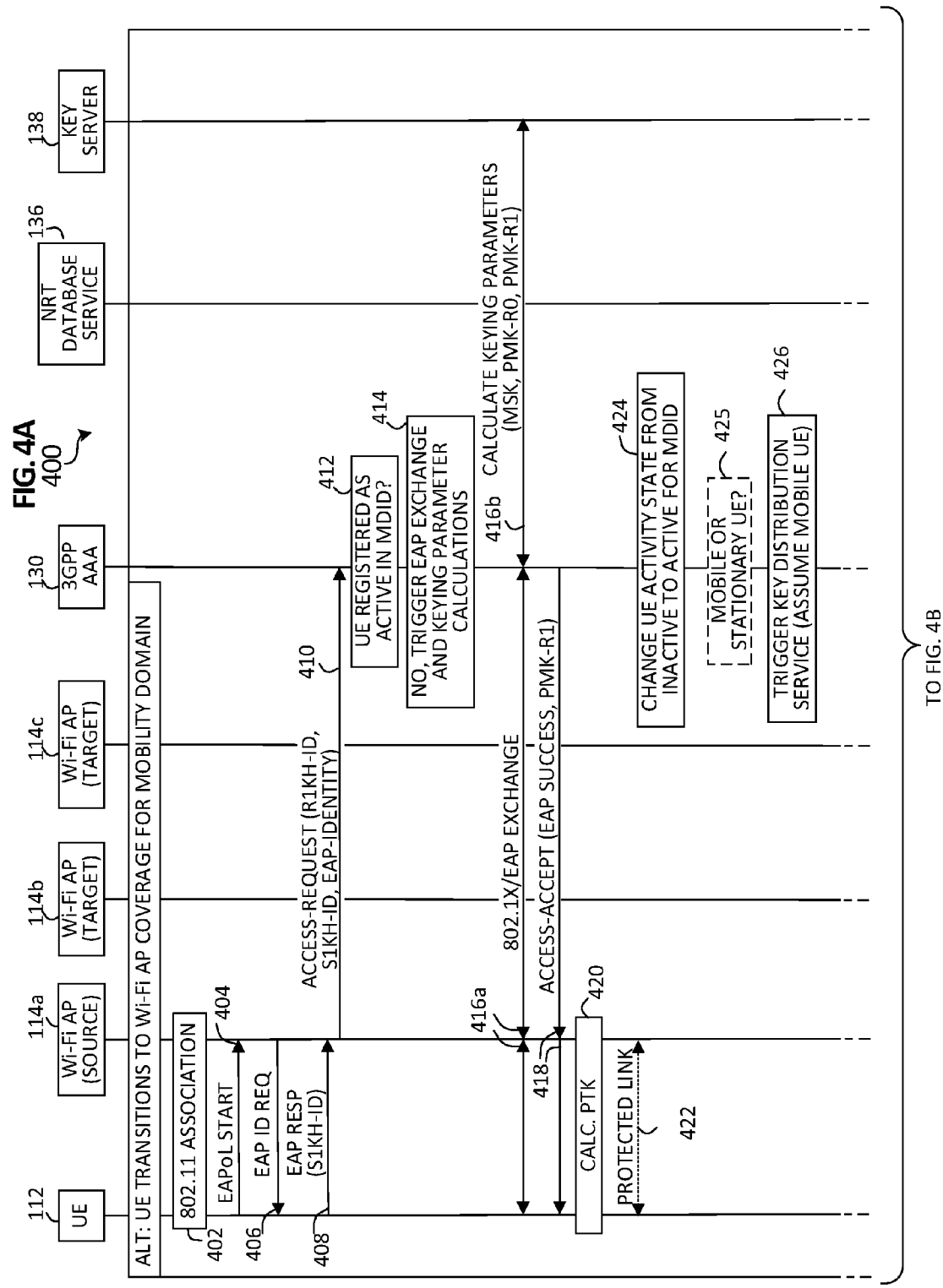

SYSTEM AND METHOD TO PROVIDE FAST MOBILITY IN A RESIDENTIAL WI-FI NETWORK ENVIRONMENT

TECHNICAL FIELD

This disclosure relates in general to the field of communications and, more particularly, to a system and method to provide fast mobility in a residential Wi-Fi network environment.

BACKGROUND

Networking architectures have grown increasingly complex in communication environments. For example, Wi-Fi access points (APs), which provide wireless connectivity according to Institute of Electrical and Electronic Engineers (IEEE) 802.11 standards, have gained notoriety due to their capabilities to connect wireless devices to a mobile network. In general terms Wi-Fi APs operate in an unlicensed spectrum to connect users to the mobile network. For a service provider (SP) providing for operation of a mobile network, Wi-Fi APs can offer improvements to both coverage and capacity, which is particularly applicable to indoor networking environments where macro cell networks typically suffer coverage limitations. Wi-Fi APs can also offer alternative networking architectures to deliver benefits of scalable service provider Wi-Fi deployments in which service provider Wi-Fi APs can be deployed to provide seamless connectivity between cellular and Wi-Fi APs.

Wi-Fi APs in current service provider commercial or enterprise deployments are often deployed in controller-based networks in which a centralized controller aggregates connectivity of the Wi-Fi APs and also provides a mechanism to enable fast mobility or handover (e.g., roaming in IEEE parlance) between Wi-Fi APs for a deployment. Controller-based Wi-Fi deployments offer certain advantages in providing a centralized mechanism to enable configuration, authentication, access control, mobility and management among Wi-Fi APs for commercial or enterprise environments. However, Wi-Fi APs are also increasingly used in residential or multi-dwelling unit (MDU) environments in which residential/MDU users deploy one or more Wi-Fi APs in a residential/MDU environment. Residential/MDU Wi-Fi deployments are often operated autonomously without a centralized controller as users add and remove Wi-Fi APs from their networks as desired. Service providers are increasingly seeking to penetrate residential/MDU Wi-Fi deployments to provide seamless mobility and services between cellular and Wi-Fi deployments. However, there are currently no standardized techniques to deliver fast mobility between autonomous Wi-Fi APs for controller-less deployments. Accordingly, there are significant challenges in providing fast mobility among autonomous Wi-Fi APs in controller-less deployments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified interaction diagram illustrating example details that can be associated with subscribing to a key distribution service by Wi-Fi access points in a residential Wi-Fi network environment in accordance with one potential embodiment of the communication system;

FIGS. 4A-4D are a simplified interaction diagram illustrating example details that can be associated with providing fast mobility among Wi-Fi access points in a residential Wi-Fi network environment in accordance with one potential embodiment of the communication system;

DETAILED DESCRIPTION OF EXAMPLE EMBODIMENTS

Overview

Figure 1A:
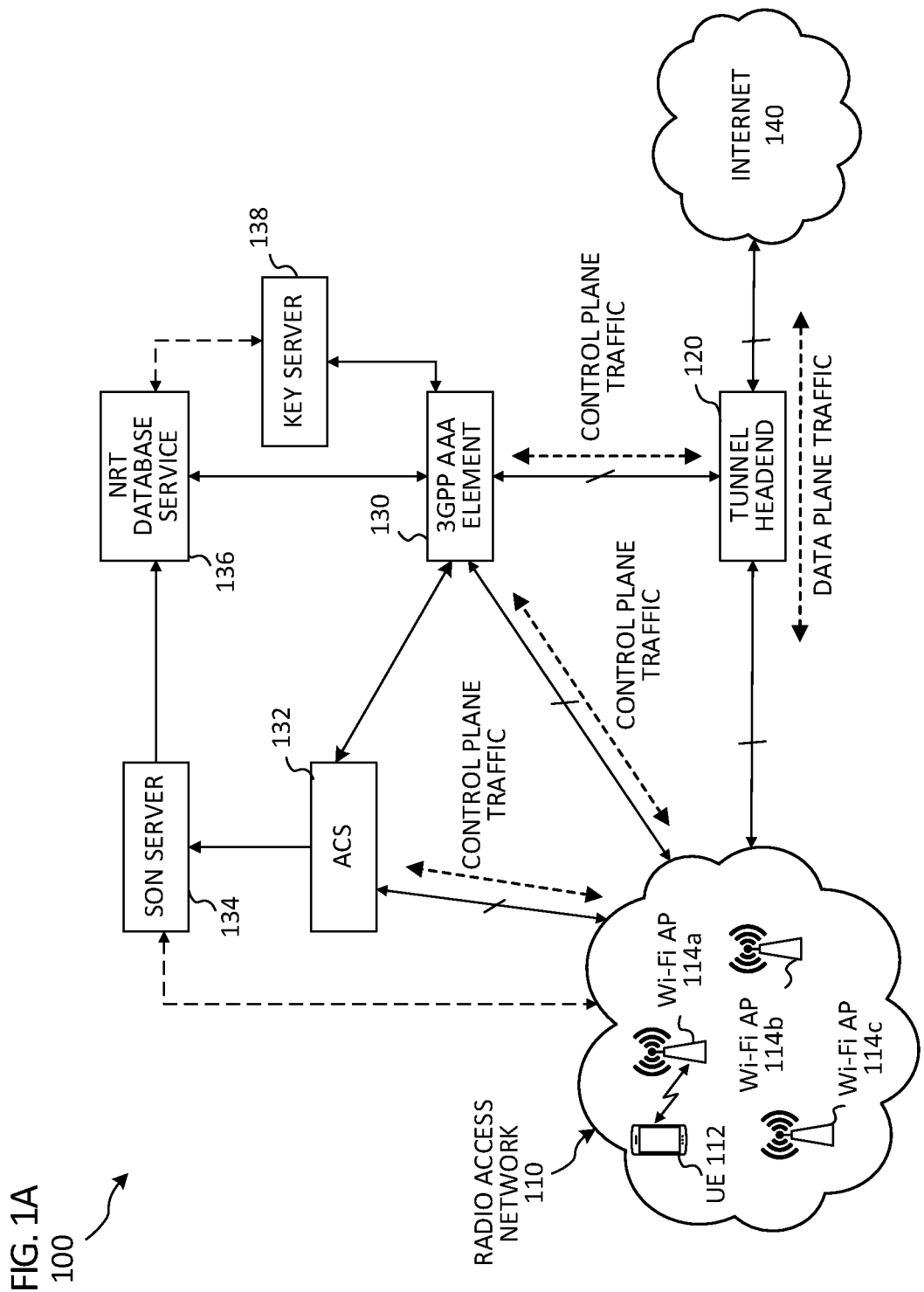
FIG. 1A is a simplified block diagram illustrating a communication system to facilitate fast mobility in a residential Wi-Fi network environment according to one embodiment of the present disclosure.

A method is provided in one example embodiment and may include subscribing to a key distribution service by a plurality of Wi-Fi access points belonging to a same mobility domain; receiving a request from a user equipment to connect to a first Wi-Fi access point of the plurality of Wi-Fi access points belonging to the same mobility domain; determining one or more second Wi-Fi access points of the plurality of Wi-Fi access points belonging to the same mobility domain that neighbor the first Wi-Fi access points; and distributing keying parameters to each of the one or more second Wi-Fi access points. The keying parameters can be associated with 802.11r pairwise master key (PMK) keying parameters. In various instances, the PMK keying parameters can include one or more of: a PMK-R1 key; an S1 key holder identity (S1KH-ID) for the user equipment; and a mobility domain identity (MDID) for the mobility domain associated with the plurality of Wi-Fi access points. In various cases, the subscribing can be performed using at least one of: Remote Authentication Dial-in User Service (RADIUS) messaging; Diameter messaging; Extensible Messaging and Presence Protocol (XMPP) messaging; and Simple Object Access Protocol (SOAP) messaging.

In some instances, the subscribing can further include: communicating a subscription request message from each of the plurality of Wi-Fi access points to an 802.11r authenticator; and communicating a subscription response message from the 802.11r authenticator to each of the plurality of Wi-Fi access points. In some instances, the 802.11r authenticator can be a 3rd Generation Partnership Project (3GPP) Authentication, Authorization and Accounting (AAA) element. In some cases, for each respective Wi-Fi access point of the plurality of Wi-Fi access points, a respective subscription request message for a respective Wi-Fi access point can include: a basic service set identifier (BSSID) for the respective Wi-Fi access point; a mobility domain identifier (MDID) for the mobility domain to which respective Wi-Fi access point belongs; and an R1 key holder identity (R1KH-ID) of the respective Wi-Fi access point.

In some cases, the method can further include generating one or more neighbor relation tables (NRTs) for the plurality of Wi-Fi access points, wherein each NRT comprises one or more Wi-Fi access points that neighbor each other for the same mobility domain; and associating each R1KH-ID and each MDID for each respective Wi-Fi access point within each NRT in which each respective Wi-Fi access point is included. In still some cases, the method can further include: determining an activity state for the user equipment; determining the one or more second Wi-Fi access points that neighbor the first Wi-Fi access point based on an NRT associated with the first Wi-Fi access point; generating the keying parameters based on an R1KH-ID for each of the one or more second Wi-Fi access points; and distributing the keying parameters to the one or more second Wi-Fi access points using the NRT associated with the first Wi-Fi access point.

Example Embodiments

For purposes of understanding certain embodiments of systems disclosed herein, it is important to appreciate the technologies and data that may be associated with IEEE 802.11 Wi-Fi deployments and network communications. The following foundational information may be viewed as a basis from which the present disclosure may be properly explained. The following foundation is offered earnestly for teaching purposes only and, therefore should not be construed in any way to limit the broad teachings of the present disclosure.

Architectures that facilitate network communications generally rely upon three basic networking planes: a data plane, a control plane, and a management plane. The data plane carries user traffic, while the control plane and the management plane serve the data plane. As referred to herein in this Specification, the term 'plane' can refer to a separation of traffic that can traverse a network. As referred to herein in this Specification, the terms 'user plane', 'data plane' and 'user data plane' can be used interchangeably. A Wi-Fi access point (AP) having integrated control plane functionality can be referred to as a gateway, or in a residential deployment a residential gateway (RG). In a controller based Wi-Fi deployment, Control and Provisioning of Wireless Access Points (CAPWAP) protocol, as defined in Internet Engineering Task Force (IETF) Request For Comments (RFC) 5414, is typically used to manage Wi-Fi access points (e.g., provide control and provisioning for Wi-Fi access points). To facilitate mobility between Wi-Fi APs in controller based architectures, a wireless Local Area Network (WLAN) controller typically manages Internet Protocol (IP) address (IP@) persistence as users/user equipment (UE) transition between Wi-Fi APs.

For non-CAPWAP/controller-less architectures, service providers (SPs) have generally settled upon tunnel headend solutions to facilitate IP@ persistence as users/UE transition between Wi-Fi APs for a deployment. Thus, residential gateways (RGs) (e.g., Wi-Fi APs) are being integrated into SP Wi-Fi systems using tunnel headend solutions for non-CAPWAP/controller-less architectures. Generally, a tunnel headend can be a network element or node such as a gateway, switch, router, server, etc. that can provide for tunnel termination for user data plane tunnels. The user data plane tunnels can be established between Wi-Fi APs and tunnel headends as users attach to and transition between Wi-Fi APs for a Wi-Fi network.

In some cases, an Authentication, Authorization and Accounting (AAA) service or server can be used in association with a headend architecture to authenticate users/UEs onto a Wi-Fi access network, including signaling information associated with user/UE location in a Wi-Fi network. For example, CableLabs® has defined various objects for reporting location-related information that are to be used, for example, leveraging RFC 5580 for reporting such information using Remote Authentication Dial-In User Service (RADIUS) and Diameter protocols. Generally, an 'object', as referred to in object-oriented programming, can refer to an instance of a class (e.g., a template), which can be defined by one or more variables, functions and/or data structures. Generally, authentication refers to the process in which an entity's identity is authenticated, typically by providing evidence that it holds a specific digital identity such as a username, identifier, etc. and corresponding credentials whereas authorization refers to the process in which it is determined whether an entity is authorized to perform a certain activity. In some cases, authorization for an entity to perform a certain activity or activities can be inherited from a successful authentication when logging on or connecting to an application, service, access point, etc. Accounting refers to the tracking of network resource consumption by users for the purpose of capacity and trend analysis, cost allocation, billing, etc.

Wi-Fi is increasingly being used to support SP conversational services including, for example, Wi-Fi calling and more handset clients (e.g., user equipment) are being deployed with IEEE 802.11r Fast Basic Service Set (BSS) Transition capability, sometimes referred to as 802.11r Fast Transition (FT), which provides for the capability for UEs to transition between Wi-Fi APs for a deployment whilst minimizing the interruption in data plane communications associated with the transition, e.g., to enable rich media to seamlessly continue without artifact, interruption or impairment associated with the switch in Wi-Fi APs. As referred to herein in this Specification, IEEE 802.11r Fast BSS Transition can also be referred to as IEEE 802.11r FT, 802.11r FT, FT, 802.11r or variations thereof. As referred to herein in this Specification, Fast Transition can generally be referred to as fast mobility. In general, 802.11r FT provides for fast mobility between Wi-Fi APs in a same mobility domain such that the mobility domain defines a set of Basic Service Sets (BSSs) within a same Extended Service Set (ESS) that support Fast BSS Transitions between themselves. A mobility domain can be identified using a Mobility Domain Identifier (MDID).

IEEE 802.11r Fast BSS Transition defines a three-level keying hierarchy in which pairwise master keys (PMKs) can be cached by various elements or nodes of a Wi-Fi network in order to facilitate fast mobility. Using 802.1X/Extensible Authentication Protocol (EAP) authentication procedures when a given UE seeks to attach to a given Wi-Fi AP, a master session key (MSK) can be created upon successful authentication of the UE.

Under 802.1X/EAP authentication procedures, a supplicant (e.g., a UE) typically provides proof of ownership of credentials (e.g., S1 key holder identity (S1KH-ID), username, response generated using private keying material to a network challenge, etc.) to an authenticator, which interfaces with an authentication key server or service to calculate the MSK for the UE session. Using the MSK and the MDID for a supplicant AP, a first level PMK key, known as a PMK-R0 key, is calculated for a PMK-R0 key holder (R0KH); a second level PMK key, known as a PMK-R1 key, is calculated for a PMK-R1 key holder (R1KH); and a third level PMK key, known as a pairwise transient key (PTK) is calculated and is used to encrypt 802.11 data frames. Typically, the authenticator in an 802.1X/EAP authentication is the R0KH and a Wi-Fi AP is the R1KH. The PMK-R1 key is typically calculated from the PMK-R0 key and the PTK is typically derived from the PMK-R1 key. Thus, a Wi-Fi AP and a UE seeking to attach to the AP can derive the PTK from the PMK-R1 key following successful authentication of the UE such that the UE becomes a PMK-S1 key holder (SIKH).

In an 802.11r FT architecture, multiple Wi-Fi APs can be supplied with their own PMK-R1 key for a UE's session to enable FT for the UE among the Wi-Fi APs. When a UE that has been successfully authenticated to a first, source AP within a given mobility domain transitions to the coverage area of a second, target AP within the mobility domain, the typical 802.1X/EAP authentication signaling for the UE can be avoided as the target AP already has the PMK-R1 key for the UE session. Thus, the handover time for the UE and the likelihood of service interruptions for the UE can be significantly reduced over a traditional 802.1X/EAP authentication exchange. In addition to 802.11r, another technology known as HotSpot (HS) 2.0 defined by the Wi-Fi Alliance, which leverages 802.1X/EAP authentication procedures, is beginning to be deployed for SP Wi-Fi networks.

In a controller based deployment, a WLAN controller is typically the PMK-R0 key holder. However, for non-CAPWAP/controller-less architectures such as residential/MDU Wi-Fi deployments, there is currently no standardized solution for supplying 802.11r keying material to autonomous Wi-Fi APs, which can fundamentally impact the ability to support fast mobility between autonomous Wi-Fi APs for residential/MDU SP Wi-Fi deployments.

Figure 1B:
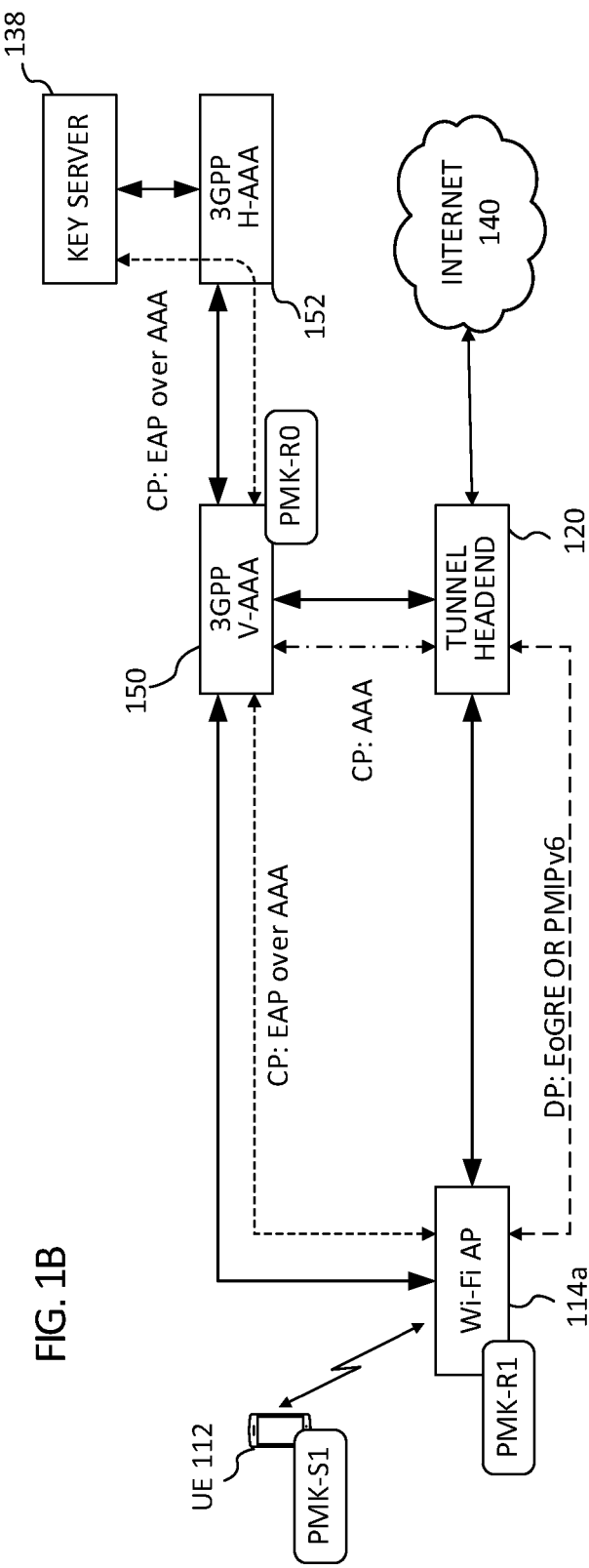
FIG. 1B is a simplified block diagram illustrating example details that can be associated the communication system.

In accordance with one embodiment, communication system 100 as shown in FIG. 1A can provide a system and method to facilitate fast mobility in a residential Wi-Fi network environment. Referring to FIG. 1A, FIG. 1A is a simplified block diagram illustrating a communication system 100 to facilitate fast mobility in a residential Wi-Fi network environment according to one embodiment of the present disclosure. In one embodiment, this particular configuration may be tied to a service provider (SP) Wi-Fi architecture, which may be integrated with a 3rd Generation Partnership Project (3GPP) architecture for the SP. Alternatively, the depicted architecture may be applicable to other environments equally. FIG. 1B illustrates example details that can be associated with various embodiments of communication system 100 shown in FIG. 1A and is described with reference to FIG. 1A.

As shown in FIG. 1A, communication system 100 can include a Radio Access Network (RAN) 110 in which users operating user equipment (UE) 112 can connect to one or more Wi-Fi Access Points (APs) 114a-114c. Although only three Wi-Fi APs are shown in FIG. 1A, any number of Wi-Fi APs can be deployed in communication system 100 in accordance with various embodiments described herein. Moreover, although only one UE is shown in FIGS. 1A-1B, it should be understood that many UE can be present in communication system 100.

Also shown in FIG. 1A, communication system 100 can include a tunnel headend 120, a 3GPP Authentication, Authorization and Accounting (AAA) element 130, an Auto-Configuration Server (ACS) 132 a Self-Organizing Network (SON) server 134, a Neighbor Relationship Table (NRT) database service 136, a key server 138 and an internet 140. Each Wi-Fi AP 114a-114c can have a logical connection with ACS 132, 3GPP AAA 130 and tunnel headend 120. In at least one embodiment, each Wi-Fi AP 114a-114c can have a logical connection with SON server 134. ACS 132 can have a logical connection with SON server 134 and 3GPP AAA element 130 and SON server 134 can further interface with NRT database service 136. 3GPP AAA element 130 can further have a logical connection with NRT database service 136, key server 138 and tunnel headend 120, which can have a logical connection with internet 140. In at least one embodiment, NRT database service 136 can have a logical connection with key server 138. As referred to herein in this Specification, a '3GPP AAA element' (e.g., 3GPP AAA element 130) can be referred to interchangeably using the term '3GPP AAA'.

Each of the elements of FIGS. 1A-1B may couple to one another through simple interfaces (as illustrated) or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' and/or 'signaling', which may be inclusive of packets. A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data networks, such as, for example, the internet 140. Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messages. Other protocols, interfaces and/or communication standards that can be used in communication system 100 can include 3GPP Diameter-based protocols, RADIUS protocols, AAA signaling, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Customer Premise Equipment (CPE) WAN Management Protocol (CWMP), etc. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

In general, RAN 110 may provide a communications interface between UE 112, ACS 132, 3GPP AAA element 130, tunnel headend, internet 140 and/or SON server 134 for one or more 3GPP and/or non-3GPP access networks via Wi-Fi APs 114a-114c. In various embodiments, 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). In various embodiments, non-3GPP IP access networks can include wireless local area networks (WLANs), such as 802.11 WiFi networks, Worldwide Interoperability for Microwave Access (WiMAX) networks, Bluetooth™ networks, combinations thereof or the like.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI), a Temporary IMSI (T-IMSI) or an EAP Pseudonym. An IMSI for a given subscriber is typically stored on a Subscriber Identity Module (SIM) (e.g., a SIM card) within the subscriber's UE.

In various embodiments, UE 112 can be associated with any users, subscribers, employees, clients, customers, electronic devices, etc. wishing to initiate a flow in communication system 100 via some network. In at least one embodiment, UE 112 is configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 100. UE 112 may also be inclusive of a suitable interface to a human user such as a microphone, a display, a keyboard, or other terminal equipment.

UE 112 may also be any device that seeks to initiate a communication on behalf of another entity or element such as a program, a database, or any other component, device, element, or object capable of initiating an exchange within communication system 100. In certain embodiments, UE 112 may have a bundled subscription for network access and application services (e.g., voice), etc. In one embodiment, once the access session is established, the user can register for application services as well, without additional authentication requirements. Within communication system 100, IP addresses (e.g., for UE or any other element in communication system 100) can be assigned using dynamic host configuration protocol (DHCP), Stateless Address Autoconfiguration (SLAAC), during default bearer activation processes, etc., or any suitable variation thereof. IP addresses used within communication system 100 can include IP version 4 (IPv4) and/or IP version 6 (IPv6) IP addresses.

Each Wi-Fi AP 114a-114c can offer suitable Wi-Fi connectivity to one or more UE (e.g., UE 112). Generally, control plane traffic for each Wi-Fi AP 114a-114c can traverse logical connections between each Wi-Fi AP and ACS 132; control plane traffic per UE connected to each Wi-Fi AP 114a-114c can traverse logical connections between each Wi-Fi AP and 3GPP AAA 130 and between 3GPP AAA 130 and tunnel headend 120; and user data plane traffic per UE connected to each Wi-Fi AP 114a-114c can traverse logical connections with tunnel headend 120 and internet 140.

In various embodiments, at initialization and/or re-initialization of each Wi-Fi AP 114a-114c, ACS 132 can manage firmware and/or image configuration of each Wi-Fi AP, which can include, but not be limited to: configuring a Service Set Identifier (SSID), a Basic Service Set Identifier (BSSID), an Extended Service Set Identifier (ESSID) and/or a MDID for each Wi-Fi AP 114a-114c; configuring an R1 key holder identity (R1KH-ID) for each Wi-Fi AP 114a-114c; configuring each Wi-Fi AP to interface with one or more elements or nodes of communication system 100 (e.g., with 3GPP AAA element 130) via one or more protocols, data models, management objects, IP addresses, port or socket numbers, authentication and/or authorization parameters, etc. for the elements or nodes, combinations thereof or the like.

In at least one embodiment, ACS 132 can configure each Wi-Fi AP 114a-114c according to the Technical Report 069 (TR-069) Amendment 2 management protocol and the CableLabs® Wi-Fi management objects; however, it should be understood that other protocol(s), data model(s) and/or management objects can be configured for each Wi-Fi AP 114a-114c. ACS 132 can interface with 3GPP AAA element 130 to gather (e.g., using push or pull exchanges) IP address information, port or socket information, authentication and/or authorization parameters, etc. to provide each Wi-Fi AP 114a-114c upon initialization, re-initialization and/or on a periodic basis. In some embodiments, ACS 132 can provide low cadence (e.g., periodic) re-configuration of each Wi-Fi AP 114a-114c.

For Wi-Fi APs 114a-114c operating in a SP 802.11r FT deployment, the BSSID of a particular AP can be the Medium Access Control (MAC) Address for the particular AP, which can be referred to herein as 'BSSID/MAC Address'. As noted above, a mobility domain defines a set of BSSs within a same ESS that support Fast BSS Transitions between themselves and can be identified using a MDID.

In various embodiments, Wi-Fi APs 114a-114c can be configured in a Closed access mode or Hybrid access mode.

For a Closed access mode deployment, users who are not included on an authorization list (e.g., whitelist, directory list, etc.) for a Wi-Fi AP cannot be served by (e.g., connect to) the Wi-Fi AP. For a Hybrid access mode deployment, a given Wi-Fi AP can be deployed having a partially Closed access mode (e.g., reserving certain resources, bandwidth, etc. for whitelisted users) and a partially Open access mode (e.g., providing certain resources, bandwidth, etc. for any users). In at least one embodiment, a whitelist service or server can be configured for any of 3GPP AAA element 130, 3GPP V-AAA element 150 (as shown in FIG. 1B) and/or 3GPP H-AAA 152 (as shown in FIG. 1B).

In various embodiments, SON server 134 can interface with ACS 132, NRT database service 136 and/or one or more of Wi-Fi APs 114a-114c. Thus, SON server 134 can have visibility of a Wi-Fi network including Wi-Fi APs 114a-114c in order to manage one or more NRTs that can be stored in NRT database service 136. In some embodiments, SON server 134 can also be used to provide coordinated control and configuration of various elements or nodes (e.g., macro cell radios, small cell radios, Wi-Fi APs, etc.) of a deployment. As referred to herein, the managing one or more NRTs can include determining neighbor relations among one or more Wi-Fi APs for a MDID, populating or building one or more NRTs and/or updating one or more NRTs. In various embodiments, NRT database service 136 can be configured as a standalone service or can be configured as part of one or more elements or nodes (e.g., SON server 134, 3GPP AAA element 130) to provide storage for one or more NRTs. For communication system 100, Wi-Fi APs 114a-114c are assumed to be neighboring Wi-Fi APs belonging to the same MDID.

FIG. 1B illustrates a roaming scenario for UE 112 in which control plane (CP) traffic between a given Wi-Fi AP, e.g., Wi-Fi AP 114a, and a 3GPP Visited AAA element (V-AAA) 150 can be exchanged via EAP over AAA signaling and data plane (DP) traffic between Wi-Fi AP 114a and tunnel headend 120 can be exchanged via EoGRE or PMIPv6, depending on configuration by a given SP. 3GPP V-AAA element 150 can interface with a Home AAA element (H-AAA) 152 and key server 138 via EAP over AAA signaling. CP traffic between 3GPP V-AAA element 150 and tunnel headend 120 can be exchanged via AAA signaling.

Generally, the AAA signaling with the tunnel headend 120 can involve generating charging records for a given UE by the tunnel headend, which may need location information SSID information, IMSI permanent identity information, etc. to generate the charging records. Information contained in charging record messaging can be used to generate a Create Session Request message, which the tunnel headend can send to a Packet Data Network (PDN) gateway (PGW), in order to create one or more GTP tunnel(s) with the PGW for one or more UE IP-Connectivity Access Network (IP-CAN) PDN sessions. A PGW is not shown in the FIGURES in order to discuss other features of communication system 100; however it should be understood that the tunnel headend 120 can interface with one or more elements or nodes of an Evolved Packet Core (EPC) or Evolved Packet System (EPS) as defined by 3GPP specifications such as, for example, a PGW, to facilitate PDN session communications for UEs via Wi-Fi APs 114a-114c.

Functionality performed via 3GPP AAA element 130 shown in FIG. 1A can be facilitated in a roaming scenario via 3GPP V-AAA element 150 and the 3GPP H-AAA element 152 as shown in FIG. 1B. Thus, FIGS. 1A and 1B illustrate that AAA functionality described for various embodiments discussed herein can be applied in a V-AAA/H-AAA scenario or in a more general AAA scenario. For the scenario shown in FIG. 1B, fast mobility for UE 112 can be facilitated such that 3GPP V-AAA element 150 is a PMK-R0 key holder, Wi-Fi AP 114a is a PMK-R1 key holder and UE 112 is a PMK-S1 key holder for any UE 112 session while UE 112 is connected to Wi-Fi AP 114a. For FIG. 1A, 3GPP AAA element 130 would be the PMK-R0 key holder. Accordingly, in an 802.11r FT architecture, either of 3GPP AAA element 130 or 3GPP V-AAA element 150 can be configured as a 802.11r authenticator for 802.1X/EAP authentication procedures.

In order to overcome the aforementioned problems involving distribution of keying material to neighboring Wi-Fi APs to facilitate 802.11r fast transition, communication system 100 advantageously provides a system and method to proactively distribute keying material to neighboring Wi-Fi APs in a non-CAPWAP/controller-less architectures (e.g., as shown in FIGS. 1A-1B) via 3GPP AAA element 130 or 3GPP V-AAA element 150, depending on deployment scenario.

Referring to FIG. 1A, during operation, in accordance with at least one embodiment, 3GPP AAA element 130 can provide 802.11r authentication, authorization and accounting services for each Wi-Fi AP 114a-114c as well as for each UE that seeks to connect to each Wi-Fi AP 114a-114c. 3GPP AAA element 130 can perform other operations as discussed in further detail for various embodiments described herein.

Upon initialization, re-initialization of each Wi-Fi AP 114a-114c and/or on a periodic basis, each Wi-Fi AP can be configured by ACS 132 and each Wi-Fi AP 114a-114c can report various information and parameters to SON server 134, which can be used to manage one or more NRTs that can be stored in NRT database service 136. In some embodiments, each Wi-Fi AP 114a-114c can report various information and parameters to SON server 134 on a periodic basis, as configured by ACS 132.

In various embodiments, information and/or parameters reported to the SON server 134 from each Wi-Fi AP can include, but are not limited to: SSID, BSSID/MAC Address, signal strength information for neighboring Wi-Fi APs, the MDID for a particular reporting Wi-Fi AP, the R1KH-ID for a particular reporting Wi-Fi AP, combinations thereof or the like. In various embodiments, each Wi-Fi AP 114a-114c can perform network listen (NWL), as configured ACS 132, to identify any neighboring Wi-Fi AP (e.g., neighboring HNBs and/or macro cell radios). Generally, NWL operations involve measuring signal strength information for OTA broadcasts transmitted by neighboring cell radios (e.g., downlink transmissions), typically performed across multiple frequencies and radio frames. In one embodiment, signal strength information can include a Received Signal Strength Indicator (RSSI), Signal-to-Noise Ratio (SINR) information, Signal-to-Interference-Plus-Noise Ratio (SINR) information, combinations thereof or the like.

In one embodiment, SSID and BSSID/MAC Address of a particular Wi-Fi AP can be reported to SON server 134 using an SSID Object, as defined by CableLabs®, which can have a format 'SSID Object (SSID, BSSID/MAC Address)' such that the SSID and the BSSID/MAC Address correspond to the particular Wi-Fi AP reporting the SSID Object. In another embodiment, SSID, BSSID/MAC Address and signal strength information can be reported to SON server 134 using a Neighboring Wi-Fi Diagnostic Result Object, as defined by CableLabs®, which can have a format 'NeighboringWiFiDiagnosticResult Object (SSID, BSSID/MAC Address, signal strength)' such that the SSID, BSSID/MAC Address and signal strength can correspond to a neighboring Wi-Fi AP that neighbors the particular Wi-Fi AP reporting the NeighboringWiFiDiagnosticResult Object. The identity of a Wi-Fi AP (e.g., BSSID/MAC address) reporting a NeighboringWiFiDiagnosticResult Object can be carried in a TR-181 (root data model for TR-069) Device.WiFi.SSID object.

It should be noted that reporting of MDID and R1KH-ID are not currently supported via CableLabs® Management Object specifications. In accordance with one embodiment of the present disclosure, a new object for carrying MDID and a new object for carrying R1KH-ID can be defined for use with CableLabs® Management Objects such that MDID and R1KH-ID can be appended to currently defined reporting objects. For example the SSID Object can be modified as: SSID Object (SSID, BSSID/MAC Address, MDID, R1KH-ID) and/or the Neighboring Wi-Fi Diagnostic Result Object can be modified as: NeighboringWiFiDiagnosticResult Object (SSID, BSSID/MAC Address, signal strength, MDID, R1KH-ID).

Although reporting of MDID and R1KH-ID are discussed herein with respect to the CableLabs® Management Objects, it should be understood that information and parameters reported to SON server 134 from each Wi-Fi AP 114a-114c can be reported using any appropriate proprietary and/or non-proprietary protocol, interface and/or communication standard, combinations thereof or the like. In one embodiment, the information and parameters reported to SON server 134 can be reported via logical interfaces connecting SON server 134, ACS 132 and each Wi-Fi AP 114a-114c. In another embodiment, the information and parameters reported to SON server 134 can be reported via logical interfaces connecting each Wi-Fi AP 114a-114c and the SON server 134, thereby bypassing ACS 132.

Using the reported information and parameters, SON server 134 can manage one or more NRTs that can be stored in NRT database service 136. In one embodiment, SON server 134 can build a topology map between BSSID/MAC addresses for a same MDID to manage one or more NRTs that can be stored in the NRT database service. MDID and R1KH-ID for each Wi-Fi AP can be associated with neighbor relations of the NRTs stored in NRT database service 136. In another embodiment, signal strength information reported among Wi-Fi APs belonging to a same MDID can be used to prioritize one or more subset(s) of neighboring Wi-Fi APs for one or more topology maps according to varying degrees or levels of signal strengths reported among the neighboring Wi-Fi APs. For example, in one embodiment, a first decibel milliwatts (dBm) threshold level can be set to determine first degree neighbors of a given Wi-Fi AP, a second, lower dBm threshold level can be set to determine second degree neighbors of the given Wi-Fi AP, and so for any number of different degrees and/or levels of neighbors that a service provider desires to prioritize.

To facilitate dynamic and proactive key distribution to facilitate 802.11r FT among neighboring Wi-Fi APs 114a-114c, each Wi-Fi AP 114a-114c can subscribe to a PMK-R1 key distribution service configured for 3GPP AAA element 130 (or any other AAA element described herein) by sending a subscription request to the 3GPP AAA element. 3GPP AAA element can be enhanced to provide the key distribution service, which can facilitate 802.11r FT among Wi-Fi APs belonging to a same MDID. In one embodiment, the subscription request can be a RADIUS-based Access-Request message sent to the 3GPP AAA element by a particular Wi-Fi AP 114a-114c during initialization with 3GPP AAA element 130 (e.g., the 802.11r authenticator) using information, parameters, etc. provided to the particular Wi-Fi AP by ACS 132.

For example, in one embodiment, a particular Wi-Fi AP can send 3GPP AAA element 130 an Access-Request message including the SSID, BSSID/MAC Address, MDID and the R1KH-ID for the Wi-Fi AP along with a flag bit(s) indicating that the particular Wi-Fi AP seeks to subscribe to the distribution service. In some embodiments, the Access-Request message can further include authentication and/or authorization credentials for the Wi-Fi AP. Upon accepting the subscription request for a particular Wi-Fi AP, the 3GPP AAA element can send a RADIUS-based Access-Accept message back to the Wi-Fi AP and can store an association of the parameters identifying the Wi-Fi AP (e.g., SSID, BSSID/MAC, MDID, R1KH-ID, etc.) with an indication that the Wi-Fi AP has subscribed to the PMK-R1 key distribution service.

Thereafter, when a given UE (e.g., UE 112) seeks to first connect to a given Wi-Fi AP for a given MDID, an EAP exchange can be performed via the UE, the Wi-Fi AP and the 3GPP AAA element 130 to determine whether the UE can connect to the Wi-Fi AP. In one embodiment, an Access-Request message initiated by UE that includes a S1KH-ID for the UE can be used to initiate the EAP exchange. If the EAP exchange is successful (e.g., the UE is authenticated/authorized to attach to the Wi-Fi AP), 802.1X/EAP keying parameters can be calculated for the UE session including an MSK, the PMK-R0 key for the R0KH (e.g., 3GPP AAA element 130) and the PMK-R1 key for the R1KH (e.g., the Wi-Fi AP). 802.1X/EAP authentication success can be communicated to the Wi-Fi AP and the UE. In one embodiment, an Access-Accept message can be sent to the UE via the Wi-Fi AP including the PMK-R1 key calculated for the UE session.

In various embodiments, the 802.1X/EAP keying parameters can be calculated via 3GPP AAA element 130, key server 138 and/or NRT database service 136. In various embodiments, key server 138 can be configured as separate, standalone server or service or can be a distributed service configured across one or more of 3GPP AAA element 130 or 3GPP V-AAA element 150, depending on use case, and/or NRT database service 136.

Attachment of the UE to the given Wi-Fi AP for the given MDID can trigger the PMK-R1 key distribution service configured for the 3GPP AAA element 130 to distribute keying parameters to neighboring Wi-Fi APs. In one sense, the Wi-Fi AP to which the UE is connected can be considered a source Wi-Fi AP and neighboring Wi-Fi APs can be considered candidate target Wi-Fi APs of the source Wi-Fi AP to which the UE can potentially be handed over upon the UE transitioning to the coverage area of a given target Wi-Fi AP.

The 3GPP AAA element 130 can query the NRT database service 136 using an Access-Request message including, at least in part, the R1KH-ID and/or the MDID of the source Wi-Fi AP. The NRT database service 136 can perform a query on NRTs stored therein using the R1KH-ID and MDID to determine potential handover (HO) target neighbor Wi-Fi APs of the source Wi-Fi AP and can respond with an Access-Response including, at least in part, a list of one or more potential HO target neighbor Wi-Fi APs of the source Wi-Fi AP that includes an R1KH-ID and MDID for each potential HO target.

In one embodiment, the 3GPP AAA element 130 can include the MSK for the UE session in the Access-Request sent to the NRT database service 136 and the NRT database service 136 can calculate a PMK-R1 key for each potential HO target Wi-Fi AP via key server 138. In such an embodiment, the PMK-R1 key for each potential HO target Wi-Fi AP can be included in the Access-Response to the 3GPP AAA element 130. In another embodiment, the 3GPP AAA element 130 may not include the MSK for the UE session in the Access-Request sent to the NRT database service 136. In such an embodiment the 3GPP AAA element 130 can calculate a PMK-R1 key for each potential HO target Wi-Fi based on the MSK and the R1KH-ID for each included in an Access-Response from the NRT database service 136.

For either embodiment, the 3GPP AAA element 130 can communicate, to each potential HO target Wi-Fi AP identified in the Access-Response, a message that includes 802.11r PMK keying parameters such that the message sent to a particular Wi-Fi AP includes the PMK-R1 key calculated for the Wi-Fi AP, the MDID and the S1KH-ID for the UE. In one embodiment, a RADIUS-based Change of Authorization (CoA) message can be used to send 802.11r keying parameters to each of one or more potential HO target Wi-Fi AP for the key distribution service. In another embodiment, a Diameter-based Re-authorization Request (RAR) message can be used to send 802.11r keying parameters to each of one or more potential HO target Wi-Fi APs for the key distribution service. Although RADIUS-based and Diameter-based AAA messaging is discussed for various embodiments described herein, it should be understood that any AAA signaling or messaging can be used to facilitate the solutions provided by communication system 100.

Thereafter, if the UE moves to the coverage area of one or more of the potential HO target Wi-Fi APs, a reduced signaling FT association exchange can be performed for the UE in which the 802.1X exchange is performed only between the UE and a given HO target Wi-Fi AP using the PMK-R1 key received by the HO target Wi-Fi AP from the 3GPP AAA element 130 without requiring additional MSK, PMK-R0, PTK and PMK-R1 keying parameter calculations for the UE session.

Various operations that can be performed within communication system 100 can be further illustrated using various example interaction diagrams, which are provided herein below with reference to FIGS. 2, 3 and 4A-4D.

Turning to FIG. 2, FIG. 2 is a simplified interaction diagram 200 illustrating example details that can be associated with subscribing to a key distribution service by Wi-Fi access points in a residential Wi-Fi network environment in accordance with one potential embodiment of communication system 100. FIG. 2 includes Wi-Fi APs 114a-114c, ACS 132 and 3GPP AAA element 130. 3GPP AAA element 130 can be configured to provide a PMK-R1 key distribution service as described herein to facilitate 802.11r FT among Wi-Fi APs belonging to a same MDID. It should be understood that subscription interactions illustrated in FIG. 2 can also be applicable in a roaming scenario including 3GPP V-AAA element 150.

At 202, a configuration (config) or re-configuration (re-config) exchange is carried out between Wi-Fi AP 114a and ACS 132. In various embodiments, configuration or re-configuration of each Wi-Fi AP 114a-114c can be performed at initialization, re-initialization or on a periodic basis. As discussed herein, ACS 132 can manage firmware and/or image configuration of each Wi-Fi AP, which can include, but not be limited to: configuring a SSID, a BSSID/MAC Address, an ESSID and/or an MDID for each Wi-Fi AP; configuring an R1KH-ID for each Wi-Fi AP 114a-114c; configuring each Wi-Fi AP 114a-114c to interface with one or more elements or nodes of communication system 100 (e.g., with 3GPP AAA element 130) via one or more protocols, data models, management objects, IP addresses, port or socket numbers, authentication and/or authorization parameters, etc. for the elements or nodes, combinations thereof or the like. In at least one embodiment, ACS 132 can configure each Wi-Fi AP 114a-114c according to the TR-069 Amendment 2 management protocol and the CableLabs® Wi-Fi management objects; however, it should be understood that other protocol(s), data model(s) and/or management objects can be configured for each Wi-Fi AP 114a-114c. ACS 132 can interface with 3GPP AAA element 130 to gather IP address information, port or socket information, authentication and/or authorization parameters, etc. to provide each Wi-Fi AP 114a-114c during configuration or re-configuration. A similar configuration or re-configuration exchange can be performed between Wi-Fi AP 114b and ACS 132 at 210 and between Wi-Fi AP 114c and ACS at 218 as well as for any other Wi-Fi APs that may be present for a given deployment.

Upon configuration, each Wi-Fi AP can perform signal strength measurements (e.g., NWL) to measure radio signals that may be transmitted by one or more neighboring Wi-Fi APs. For example, at 204, Wi-Fi AP 114a can perform signal strength measurements of any neighboring Wi-Fi APs (e.g., Wi-Fi AP 114b, 114c); at 212, Wi-Fi AP 114b can perform signal strength measurements of any neighboring Wi-Fi APs (e.g., Wi-Fi AP 114a, 114c); and at 220, Wi-Fi AP 114c can perform signal strength measurements of any neighboring Wi-Fi APs (e.g., Wi-Fi AP 114a, 114b).

To subscribe to the PMK-R1 key distribution service provided by 3GPP AAA element 130, each Wi-Fi AP 114a-114c can send 3GPP AAA element 130 an enhanced Access-Request message that includes, among other thing, a flag 'SUBSCRIBE_TO_KEY_DIST_SVC'. At 206, Wi-Fi AP 114a can send an enhanced Access-Request to 3GPP AAA element 130 including the SSID, BSSID/MAC, MDID and R1KH-ID configured for Wi-Fi AP 114a as well as the flag SUBSCRIBE_TO_KEY_DIST_SVC having one or more bit(s) set to indicate that Wi-Fi AP 114a desires to subscribe to the PMK-R1 key distribution service provided by 3GPP AAA element 130. At 208, 3GPP AAA element can respond with an Access-Accept message. In one embodiment, the Access-Accept message can be enhanced to carry a flag 'SUBSCRIBED_TO_KEY_DIST_SVC' having one or more bit(s) set to indicate that a given Wi-Fi AP has successfully subscribed to the PMK-R1 key distribution service. A similar exchange can be performed for Wi-Fi APs 114b at 214-216 and Wi-Fi AP 114c at 222-224 as well as for any other Wi-Fi APs that may be present for a given deployment.

Figure 3:
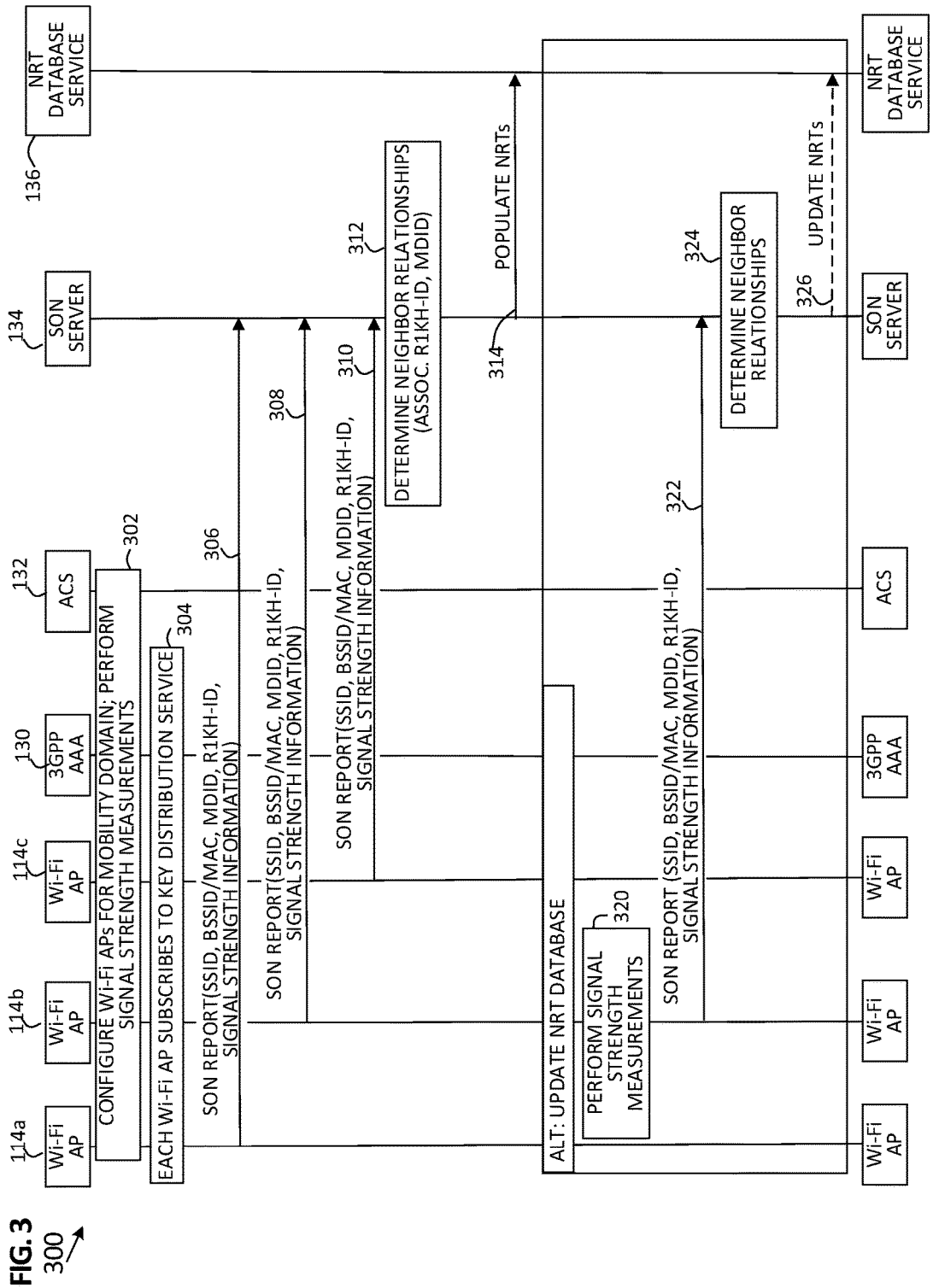
FIG. 3 is a simplified interaction diagram illustrating example details that can be associated with managing Wi-Fi neighbor relationship tables in a residential Wi-Fi network environment in accordance with one potential embodiment of the communication system.

Referring to FIG. 3, FIG. 3 is a simplified interaction diagram 300 illustrating example details that can be associated with managing Wi-Fi neighbor relationship tables (NRTs) in a residential Wi-Fi network environment in accordance with one potential embodiment of communication system 100. FIG. 3 includes Wi-Fi APs 114a-114c, 3GPP AAA element 130, ACS 132, SON server 134 and NRT database service 136. 3GPP AAA element 130 can be enhanced to provide a PMK-R1 key distribution service as described herein to facilitate 802.11r FT among Wi-Fi APs belonging to a same MDID. It should be understood that subscription interactions illustrated in FIG. 2 can also be applicable in a roaming scenario including 3GPP V-AAA element 150.

At 302, Wi-Fi APs 114a-114c can be configured via ACS 132 for a given mobility domain as discussed for various embodiments described herein (e.g., as discussed for the embodiments shown in FIGS. 1A-1B, 2). Upon configuration, each Wi-Fi AP can perform signal strength measurements (e.g., NWL) to measure radio signals that may be transmitted by one or more neighboring Wi-Fi APs. At 304, each Wi-Fi AP 114a-114c subscribes to the PMK-R1 key distribution service provided by 3GPP AAA element 130 as discussed for various embodiments described herein (e.g., as discussed for various embodiments described herein (e.g., as discussed for the embodiments shown in FIGS. 1A-1B, 2).

For the embodiment shown in FIG. 3, SON server 134 can determine neighbor relationships based on information and parameters reported to SON server 134 from each Wi-Fi AP 114a-114c. In one embodiment, information and parameters can be reported to SON server 134 from each Wi-Fi AP 114a-114c using one or more CableLabs® enhanced management objects such as, for example, the SSID Object and/or the Neighboring Wi-Fi Diagnostic Result Object, either of which can be enhanced to carry an R1KH-ID object and an MDID object for the reporting. However, other messages, reporting objects, etc. can be used to carry the information and parameters for the reporting performed by each Wi-Fi AP 114a-114c. For the embodiment shown in FIG. 3, a generic SON REPORT( ) message is illustrated, which can be used to carry the information and parameters reported to SON server 134.

At 306, Wi-Fi AP 114a sends a SON REPORT to SON server 134 including the SSID, BSSID/MAC, MDID and R1KH-ID configured for Wi-Fi AP 114a as well as signal strength information measured by Wi-Fi AP 114a for any neighboring Wi-Fi APs (e.g., Wi-Fi APs 114b, 114c). At 308, Wi-Fi AP 114b sends a SON REPORT to SON server 134 including the SSID, BSSID/MAC, MDID and R1KH-ID configured for Wi-Fi AP 114b as well as signal strength information measured by Wi-Fi AP 114b for any neighboring Wi-Fi APs (e.g., Wi-Fi APs 114a, 114c). At 310, Wi-Fi AP 114c sends a SON REPORT to SON server 134 including the SSID, BSSID/MAC, MDID and R1KH-ID configured for Wi-Fi AP 114c as well as signal strength information measured by Wi-Fi AP 114c for any neighboring Wi-Fi APs (e.g., Wi-Fi APs 114a, 114b).

At 312, SON server 134 determines neighbor relationships between Wi-Fi APs 114a-114c based on the information and parameters reported from each Wi-Fi AP. SON server 134 can include in the neighbor relationships an association of R1KH-ID and MDID for each Wi-Fi AP. At 314, SON server 134 can populate or update one or more NRT(s), which can be stored in NRT database service 136. In one embodiment, the association of R1KH-ID and MDID for each Wi-Fi AP 114a-114c stored within each NRT(s) can be used as query indices for the one or more NRTs stored in NRT database service 136. The R1KH-ID and MDID query indices can be used during operation in order for 3GPP AAA element 130 determine potential handover (HO) target Wi-Fi APs when a given UE attaches to a given Wi-Fi AP of a given MDID.

Although only three Wi-Fi APs are shown for communication system 100, it is conceivable that tens, hundreds, thousands, etc. of Wi-Fi APs can be deployed and may share a same MDID. In various embodiments, signal strength information for neighboring Wi-Fi APs as reported by each Wi-Fi AP that may be deployed in communication system 100 can be used to determine different degrees or levels of neighboring APs for each Wi-Fi AP to order or prioritize neighbor APs for each Wi-Fi AP. The prioritization can be used to determine potential HO target neighbor APs for a given AP. Accordingly, signal strength information can be used by SON server 134 can be used in combination with other parameters reported by each Wi-Fi AP to manage one or more NRT(s) stored in NRT database service.

FIG. 3 illustrates an alternative example use case at 320-326 in which NRT(s) stored in NRT database service 136 can be updated. For example, in one embodiment, Wi-Fi AP 114b may again perform signal strength measurements (e.g., using NWL) at 320. In various embodiments, a given Wi-Fi AP (e.g., Wi-Fi AP 114b) can be configured to perform radio environment scans on a periodic basis, at initialization, re-initialization, when a new AP is added to a deployment, etc. in order to populate or update one or more NRTs. At 322, Wi-Fi AP 114b sends a SON REPORT to SON server 134 including the SSID, BSSID/MAC, MDID and R1KH-ID configured for Wi-Fi AP 114b as well as signal strength information measured by Wi-Fi AP 114b for any neighboring Wi-Fi APs. At 324, SON server 134 determines neighbor relationships between Wi-Fi APs 114a-114c based on the information and parameters reported from each Wi-Fi AP. SON server 134 can include in the neighbor relationships an association of R1KH-ID and MDID for each Wi-Fi AP. If any neighbor relationships have changed, SON server 134 can update one or more NRT(s) stored in NRT database service 136 as shown at 326.

Referring to FIGS. 4A-4D, FIGS. 4A-4D are a simplified interaction diagram 400 illustrating example details that can be associated with providing fast mobility among Wi-Fi access points in a residential Wi-Fi network environment in accordance with one potential embodiment of communication system 100. FIGS. 4A-4D include UE 112, Wi-Fi APs 114a-114c, 3GPP AAA element 130, NRT database service 136 and key server 138. 3GPP AAA element 130 can be enhanced to provide a PMK-R1 key distribution service as described herein to facilitate 802.11r FT among Wi-Fi APs belonging to a same MDID. As discussed in further detail herein, 3GPP AAA element 130 can also be enhanced to be a PMK-R0 key holder for 802.1X/EAP authentications performed for the 802.11r FT architecture of communication system 100. It should be understood that subscription interactions illustrated in FIG. 2 can also be applicable in a roaming scenario including 3GPP V-AAA element 150.

For FIGS. 4A-4D, it is assumed that each Wi-Fi AP 114a-114c has been configured by ACS 132 and each has subscribed to the PMK-R1 key distribution service configured for 3GPP AAA element 130 (e.g., as described in FIG. 2). Wi-Fi APs 114b-114c are assumed to belong to the same mobility domain identifier (MDID) as Wi-Fi AP 114a. For FIGS. 4A-4D it is further assumed that each Wi-Fi AP has reported various information and parameters to SON server 134, which has determined that Wi-Fi APs 114a-114c are neighboring Wi-Fi APs and has populated at least one NRT for NRT database service 136 accordingly such that the NRT includes an association of the R1KH-ID and MDID for each Wi-Fi AP 114a-114c in the NRT (e.g., as described in FIG. 3).

Figure 4B:
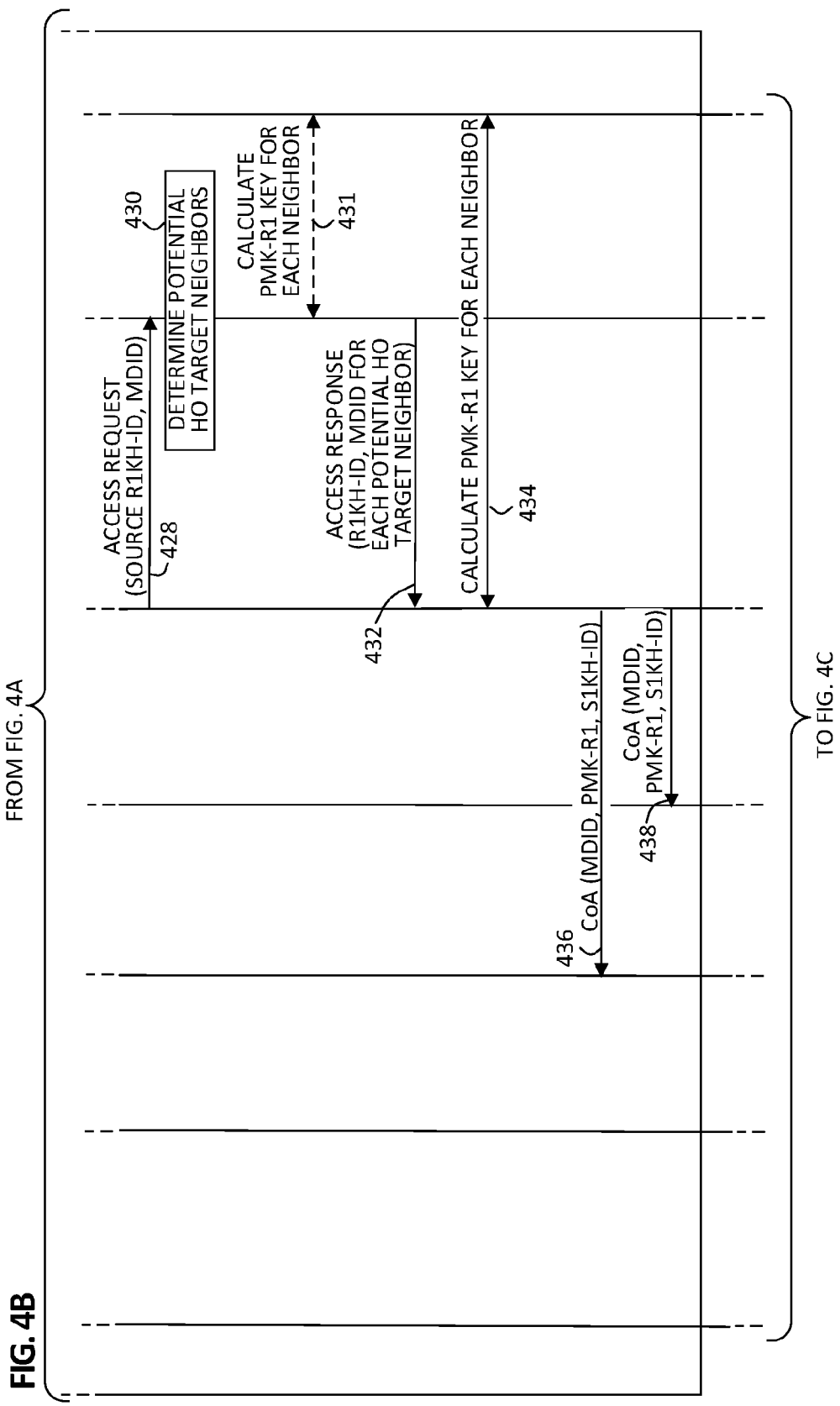
Figure 4C:
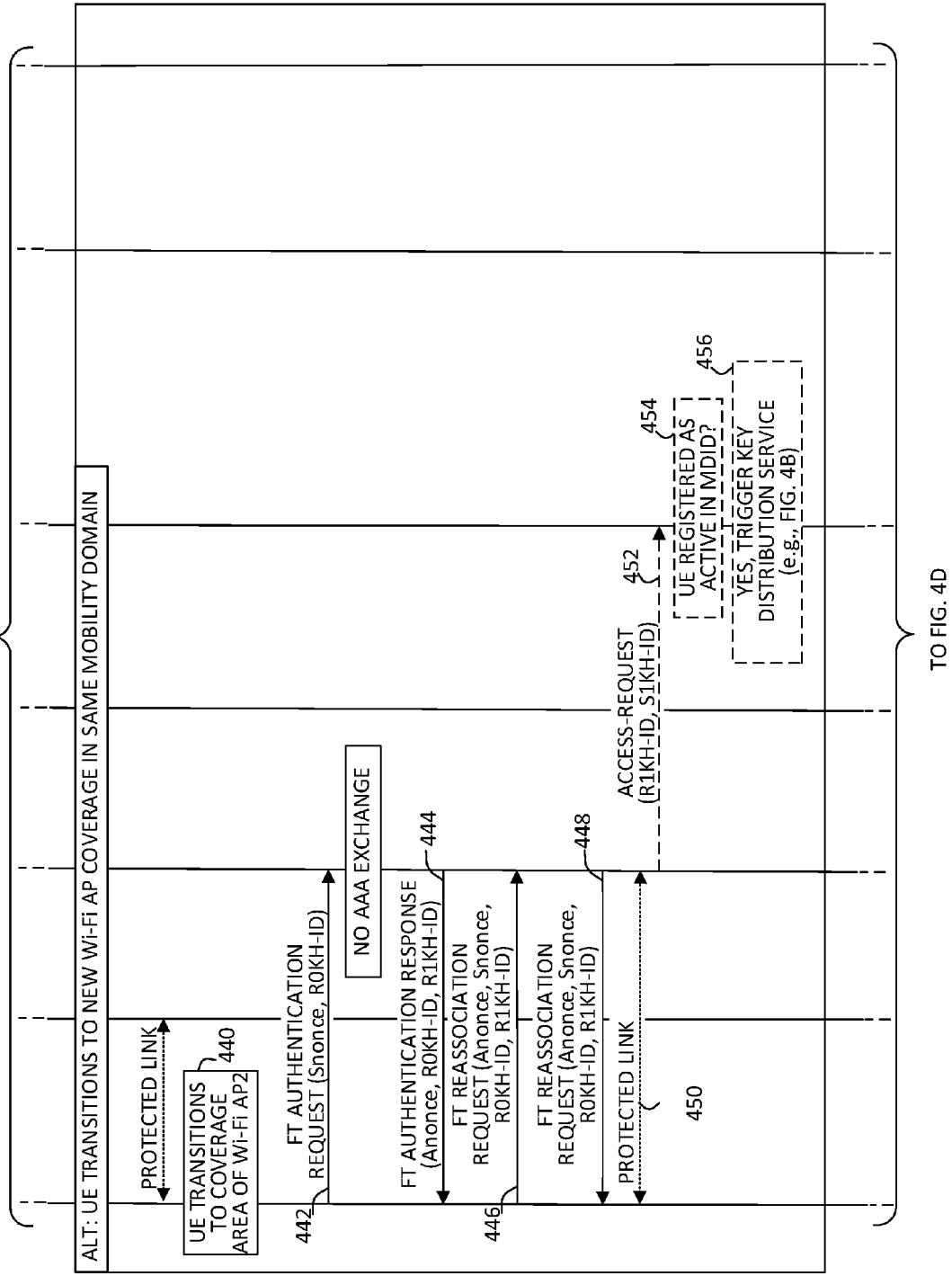
Figure 4D:
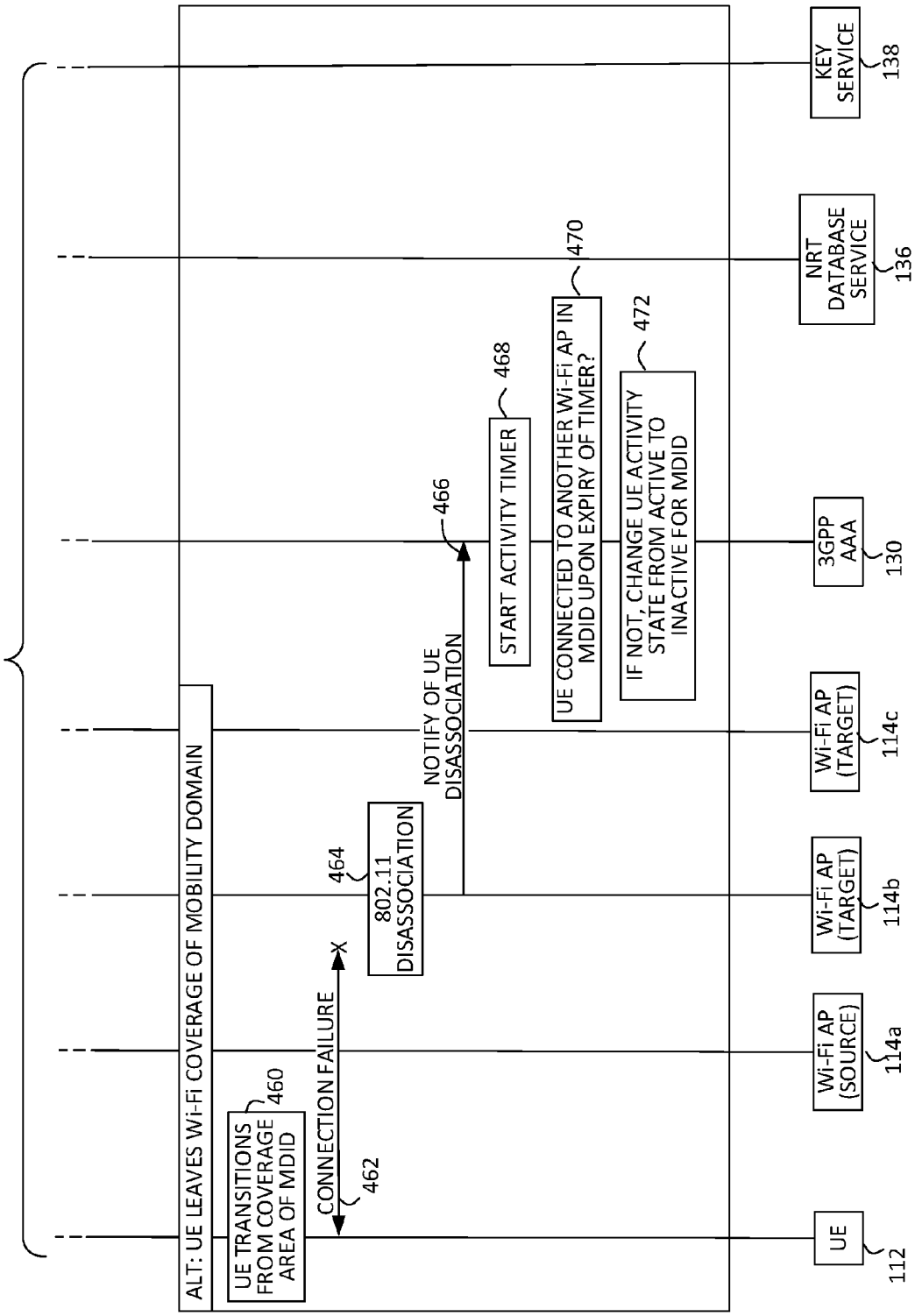

Various example details are illustrated in FIGS. 4A-4D for various alternative example use cases, which can occur in a residential Wi-Fi network environment. For example, FIGS. 4A-4B illustrate example details that can be associated one example use case in which UE 112 transitions to a Wi-Fi coverage area of a given Wi-Fi AP say, for example Wi-Fi AP 114a for a given mobility domain. FIG. 4C illustrates another example use case in which UE 112 transitions from the coverage area of Wi-Fi AP 114a to another Wi-Fi AP, say for example, Wi-Fi AP 114b within the same MDID and FIG. 4D illustrates another example use case in which UE 112 transitions from the coverage area of the MDID altogether.

In general, a Wi-Fi AP can transmit Wi-Fi beacons within beacon frames, which can be received by UE within a vicinity (e.g., coverage area) of the Wi-Fi AP. Reception of a WiFi beacon by a given UE causes the UE to initiate a probing exchange with the Wi-Fi AP as prescribed by 802.11 standards. Through the probing exchange, the Wi-Fi AP can determine whether the UE shares at least one common supported data rate with the Wi-Fi AP. If so, additional 802.11 authentication and association procedures can be carried out between the Wi-Fi AP and the UE. If not, no further communication may be exchanged between the UE and the Wi-Fi AP.

As prescribed by IEEE 802.11, association procedures carried out between a UE and Wi-Fi AP are used to establish an AP/UE mapping that enables UE invocation of system services. Association differs from authentication in that authentication, as discussed herein, generally refers to the process where an entity's identity is authenticated, typically by providing evidence that it holds a specific digital identity such as a username, identifier, etc. and corresponding credentials. Association of a UE typically follows a successful authentication of the UE with a Wi-Fi AP. In various embodiments, communication system 100 can support different 802.1X/EAP authentication techniques including: EAP-Subscriber Identity Module (EAP-SIM) authentication, EAP-Authentication and Key Agreement (EAP-AKA) authentication, EAP-Transport Layer Security (EAP-TLS) authentication, EAP-Tunneled Transport Layer Security (EAP-TTLS) or the like as defined by IETF standards.

Referring to FIG. 4A, it is assumed that UE 112 transitions to the coverage area of Wi-Fi AP 114a and an 802.11 association procedure is carried out between UE 112 and Wi-Fi AP 114a at 402. During the 802.11 association procedure, the MDID for Wi-Fi AP 114a is sent to UE 112 in a Mobility Domain Information Element (MDIE) and the R1KH-ID for Wi-Fi AP 114a along with the R0KH-ID for 3GPP AAA element 130 are sent to UE 112 during the 802.11 association in a FT Information Element (FTIE). At 404, it is assumed the 802.11 association is successful and UE 112 sends an EAP over LAN (EAPoL) start request message to Wi-Fi AP 114a. At 406, Wi-Fi AP 114a responds with an EAP ID Request message and at 408, UE 112 responds with an EAP Response message including the S1KH-ID of UE 112.

Continuing to 410, Wi-Fi AP 114a sends an Access-Request message to 3GPP AAA element 130 to authenticate/authorize attachment of the UE to Wi-Fi AP 114a. The Access-Request message can include, among other things, the R1KH-ID for Wi-Fi AP 114a, the S1KH-ID for UE 112 and the EAP-Identity provided by the UE. To facilitate the enhanced PMK-R1 key distribution functionality configured for 3GPP AAA element 130, the 3GPP AAA element can maintain 'activity state' information for each UE within each MDID served by the 3GPP AAA element. In one embodiment, activity state information for a given UE within a given MDID can be represented as 'Active' or 'Inactive' for the given MDID to register when a UE has entered (e.g., change from Inactive state to Active state) or exited (e.g., change from Active state to Inactive state) the coverage areas of Wi-Fi APs for a given MDID. During operation, the activity state registered for a given UE within a given MDID can be used to determine whether the UE has transitioned into a given mobility domain for a first time or whether the UE has transitioned from one Wi-Fi AP to another Wi-Fi AP within the mobility domain. In various embodiments, the activity state for a given UE within a given mobility domain can be stored as a Boolean value (TRUE, FALSE), a bit, a word, a flag, combinations thereof or the like such that activity state information for the UE is an association of an identity for the UE, a given MDID and the activity state for the UE within the MDID.

For the example use case shown in FIG. 4A, the Access-Request message can trigger a check by 3GPP AAA element 130 at 412 to determine whether UE 112 has been previously registered as active within the MDID to which Wi-Fi AP 114a belongs. It is assumed for the example use case that UE 112 has not been previously registered as active within the MDID; thus, 3GPP AAA element 130 determines at 414 that the UE is not active (e.g., is currently inactive) for the MDID and an 802.1X/EAP exchange and calculation of PMK keying parameters are triggered for the UE.

An 802.1X/EAP exchange with between UE 112 and 3GPP AAA element 130 (via Wi-Fi AP 114a) is performed at 416a to authenticate/authorize UE 112 to attach to Wi-Fi AP 114a. In various embodiments, the 802.1X/EAP exchange can be a standardized EAP exchange in which credentials (e.g., username, password, SIM card response, etc.) can be requested (e.g., via an EAP-challenge-request) by 3GPP AAA element 130 and responded to by UE 112 (e.g., via an EAP-challenge-response).

Assuming the 802.1X/EAP exchange is successful, 3GPP AAA element 130 via key server 138 can calculate, at 416b, one or more PMK keying parameters for the UE 112 session, which can include an MSK for the session, a PMK-R0 key for 3GPP AAA element 130 and a PMK-R1 key for Wi-Fi AP 114a. At 418, 3GPP AAA element 130 sends an Access-Accept message to Wi-Fi AP 114a including an indication of the EAP success, the PMK-R1 key for Wi-Fi AP 114a for the UE 112 session and the R0KH-ID for 3GPP AAA element 130, and Wi-Fi AP 114a sends the information to UE 112. At 420, Wi-Fi AP 114a and UE 112 can calculate the PTK for the UE's session and attachment to Wi-Fi AP 114a based on the PMK-R1 key such that the UE becomes a PMK-S1 key holder (SIKH). Following calculation of the PTK, a protected link is established at 422 between UE 112 and Wi-Fi AP 114a.

Following successful authentication of UE 112, 3GPP AAA element can change the activity state for UE 112 from Inactive to Active within the MDID at 424, which can trigger the key distribution service provided by 3GPP AAA element 130 at 426.

In one embodiment, before triggering the key distribution service, 3GPP AAA element 130 can make a determination at 425 regarding whether the UE 112 is a mobile or stationary UE. For example, in some cases, the UE could be a stationary UE such as, for example, an appliance, parking meter, etc. in which case FT mobility may not be needed for the UE. In some embodiments, a UE ID, BSSID/MAC address (e.g., corresponding to a certain address range) or other identifying parameter can be used to determine whether a UE is mobile or stationary. In one embodiment, International Mobile Station Equipment Identity (IMEI) and/or IMEI Software Version (IMEISV) for a given UE could be appended to an EAP exchange as prescribed by RFC 7458. In such an embodiment, the 3GPP AAA element could perform a look-up on an IMEI and/or IMEISV for a given UE to determine whether the UE is mobile or stationary. For the embodiment shown in FIGS. 4A-4D, it is assumed that UE 112 is a mobile UE.

Under an assumption that UE 112 is a mobile UE and that the activity state for the UE as changed from Inactive to Active for the MDID, the key distribution service configured for 3GPP AAA element 130 can provide for querying NRT database service 136 using an Access-Request message at 428 that includes, at least in part, the R1KH-ID and the MDID for Wi-Fi AP 114a, which is assumed to be a source AP in the current example use case.

At 430, NRT database service performs a look-up using the R1KH-ID and MDID for Wi-Fi AP 114a to determine potential HO target neighbors of the AP and responds with an Access-Response message at 432 including the R1KH-ID and the MDID for each potential HO target neighbor Wi-Fi AP. For the current example use case, it is assumed that the response includes an R1KH-ID and MDID for Wi-Fi AP 114b and an R1KH-ID and MDID for Wi-Fi AP 114c.

In one embodiment, the Access-Request sent from 3GPP AAA element 130 can include the MSK for the UE 112 session, in which case, NRT database service 136 via key server 138 can calculate a PMK-R1 key for each potential HO target Wi-Fi AP at 431. In such an embodiment, the NRT database service can include the PMK-R1 key along with the R1KH-ID and MDID for each potential HO target in the Access-Response message to the 3GPP AAA element 130.

However, for the embodiment shown in FIGS. 4A-4D, it is assumed that 3GPP AAA element 130 via key server 138 calculates the PMK-R1 key for each potential HO target neighbor Wi-Fi AP 114b, 114c at 434. At 436, 3GPP AAA element 130 sends a CoA to Wi-Fi AP 114b with PMK keying parameters including the MDID, the PMK-R1 key for the UE 112 session and the S1KH-ID for UE 112. At 438, 3GPP AAA element 130 sends a CoA to Wi-Fi AP 114c with PMK keying parameters including the MDID, the PMK-R1 key for the UE 112 session and the S1KH-ID for UE 112. Thus, as shown in FIGS. 4A-4B, communication system 100 can facilitate 802.11r FT between neighboring Wi-Fi APs belonging to a same MDID using a PMK-R1 key distribution service configured for a 3GPP AAA element residing in communication system 100.

Moving to FIG. 4C, it is assumed that UE 112 has a protected link established with Wi-Fi AP 114a (e.g., source Wi-Fi AP) and transitions from the coverage area of Wi-Fi AP 114a into the coverage area of potential HO target Wi-Fi AP in the same MDID as Wi-Fi AP 114a, say, for example into the coverage area of Wi-Fi AP 114b (e.g., target Wi-Fi AP), as shown at 440. At 442, upon UE 112 detecting Wi-Fi AP 114b, the UE sends an 802.11r FT Authentication Request to Wi-Fi AP 114b including, at least in part, a supplicant nonce (Snonce) and the R0KH-ID for 3GPP AAA element 130. Generally, a nonce is an arbitrary (e.g., random or pseudo-random) number that can be used in communication exchanges to ensure protected communications.

Because Wi-Fi AP 114b previously received PMK keying parameters for UE 112 at 430, no exchanges with 3GPP AAA element 130 are needed for UE 112 authentication. At 444, target Wi-Fi AP 114b sends UE 112 a FT Authentication Response including, at least in part, an Authenticator nonce (Anonce), the R0KH-ID and the R1KH-ID for Wi-Fi AP 114b indicating successful authentication. In some embodiments, an 802.11 disassociation can be carried out between UE 112 and Wi-Fi AP 114a; however, disassociation is not required according to 802.11 standards.

At 446, UE 112 responds with an FT Reassociation Request including, at least in part, the Anonce, the Snonce, the R0KH-ID and the R1KH-ID. At 448, Wi-Fi AP 114b responds with an FT Reassociation Response including, at least in part, the Anonce, the Snonce, the R0KH-ID and the R1KH-ID for Wi-Fi AP 114b indicating successful association for the UE and a protected link is established between UE 112 and Wi-Fi AP 114b at 450.

In at least one embodiment, Wi-Fi APs 114a-114c can be configured to trigger sending an Access-Request message to 3GPP AAA element for any UE attachment to the Wi-Fi APs, which can be used to trigger distribution or re-distribution of PMK keying material to potential HO target neighbor Wi-Fi APs upon a UE transitioning into a given mobility domain and/or the UE transitioning between Wi-Fi APs for the mobility domain. For example, PMK keying material can be distributed to first degree neighboring Wi-Fi APs of a given Wi-Fi AP when a UE transitions into a mobility domain (e.g., as shown in FIGS. 4A-4B). If the UE then transitions into the coverage area of a first neighboring Wi-Fi AP, attachment to the first neighboring Wi-Fi AP via FT Authentication/Reassociation can trigger an Access-Request message to be sent from the first neighboring Wi-Fi AP to the 3GPP AAA element 130. The 3GPP AAA element 130 can check if the UE is already registered as active in the MDID and if so, then another distribution of keying material to any new potential first degree HO target neighbors of the first neighboring Wi-Fi AP and/or to any potential second degree HO target neighbors for the Wi-Fi AP from which the UE transitioned can be triggered at the 3GPP AAA element. In this manner, PMK keying material can be distributed to one or more subsets of Wi-Fi APs belonging to an MDID based on the location of the UE within the mobility domain.

Thus, in one embodiment, Wi-Fi AP 114b can send an Access-Request message to 3GPP AAA element 130 upon reassociation of UE 112 to Wi-Fi AP 114b at 452. Upon receiving the Access-Request, 3GPP AAA element can check the activity state for UE 112 at 454 to determine whether UE 112 has been previously registered as active within the MDID to which Wi-Fi AP 114b belongs. It is assumed for the example use case that UE 112 has been previously registered as active within the MDID (e.g., at 424); thus, 3GPP AAA element 130 determines at 456 that the UE is already active for the MDID and the PMK-R1 key distribution service is triggered to distribute PMK keying materials to any new potential HO target neighbors of Wi-Fi AP 114b. For example, in one embodiment, interactions and operations as shown in FIG. 4B can be performed again to determine potential HO target neighbors of Wi-Fi AP 114b. In another embodiment, 3GPP AAA element can determine nth degree neighbors of the first Wi-Fi AP to which the UE attached upon entering the MDID (e.g., Wi-Fi AP 114a) based on the location and/or number of transitions of the UE within the mobility domain.

Continuing to FIG. 4D, it is assumed at 460 that UE 112 transitions from the coverage area of any Wi-Fi AP for the MDID. At 462, a connection failure occurs between UE 112 and Wi-Fi AP 114b. At 464, Wi-Fi AP 114b performs an 802.11 disassociation after a period of no communication with UE 112. At 466, Wi-Fi AP 114b notifies 3GPP AAA element 130 of the disassociation of UE 112. At 468, 3GPP AAA element 130 starts an activity timer for UE 112, which provides a period in which to wait for the UE to potentially associate with another Wi-Fi AP for the MDID. At 470, upon expiry of the activity timer, the 3GPP AAA element 130 determines whether the UE is connected to another Wi-Fi AP in the MDID. If the UE is not connected to another Wi-Fi AP in the MDID upon expiry of the activity timer, the 3GPP AAA element 130 changes the activity state for UE 112 from active to inactive for the MDID at 472. Thus, as shown in FIGS. 4A-4D, communication system 100 can facilitate 802.11r FT for a residential/MDU SP Wi-Fi network.

Figure 5:
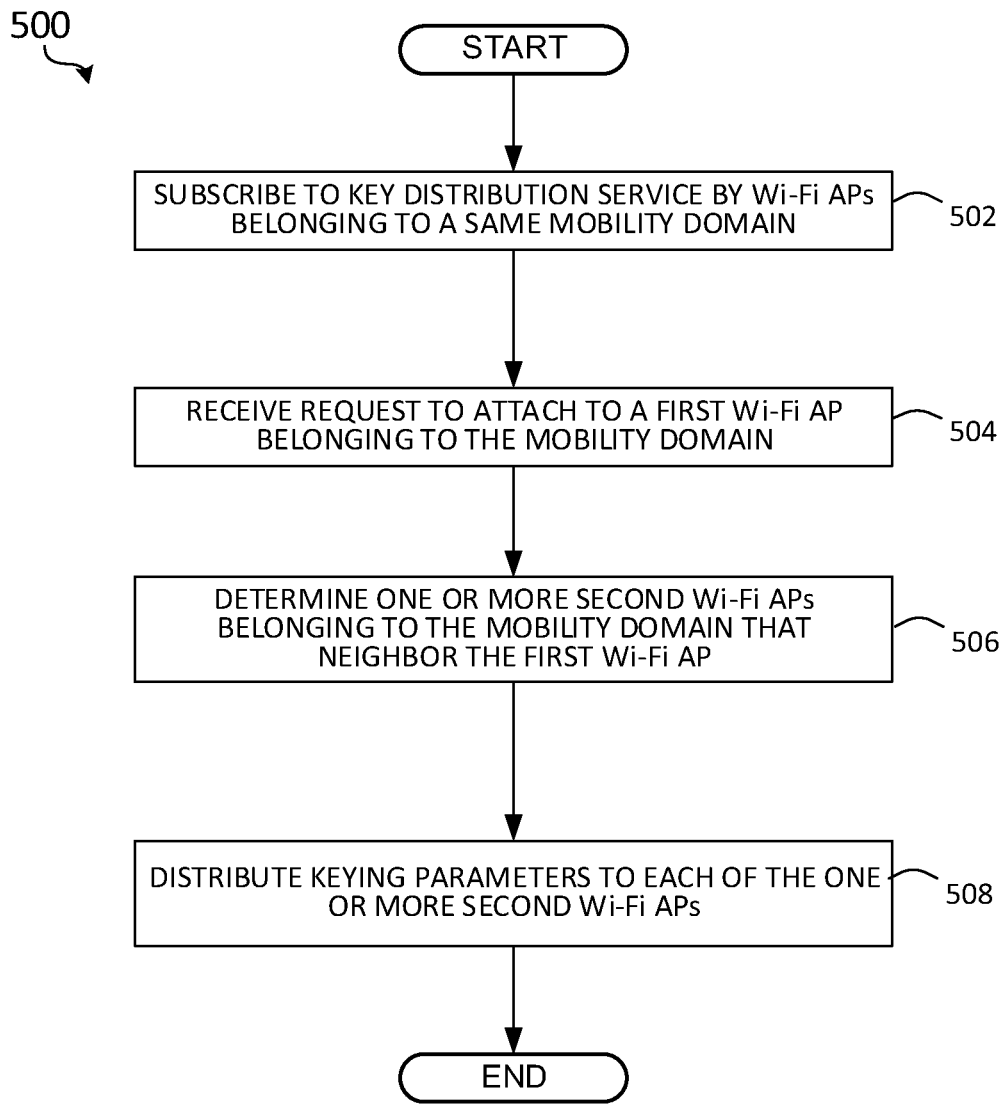
FIG. 5 is a simplified flow diagram illustrating example operations that can be associated with providing fast mobility in a residential Wi-Fi network environment in accordance with one potential embodiment of the communication system.

Referring to FIG. 5, FIG. 5 is a simplified flow diagram illustrating example operations 500 that can be associated with providing fast mobility in a residential Wi-Fi network environment in accordance with one potential embodiment of communication system 100. In various embodiments, operations 500 can be performed by one or more Wi-Fi APs (e.g., Wi-Fi APs 114a-114c) that belong to a same mobility domain, a 3GPP AAA element (e.g., 3GPP AAA element 130, 3GPP V-AAA element 150), a SON server (e.g., SON server 134), an ACS (e.g., ACS 132), a NRT database service (e.g., NRT database service 136) and/or a key server (e.g., key server 138). In at least one embodiment, operations 500 assume that each Wi-Fi AP has reported information and parameters to the SON server, as discussed herein, and that the SON server has populated and/or updated one or more one or more NRTs based on the reported information and parameters.

The operations can begin at 502 in which the Wi-Fi APs belonging to the same mobility domain subscribe to a key distribution service via the 3GPP AAA element. At 504, the operations include receiving a request from a UE (e.g., UE 112) to attach to a first Wi-Fi AP belonging to the mobility domain. At 506, the operations include determining, by the 3GPP AAA, one or more second Wi-Fi APs belonging to the mobility domain that neighbor the first Wi-Fi AP. The determination can be made by the 3GPP AAA element querying the NRTs stored in the NRT database using the MDID and the R1KH-ID of the first Wi-Fi AP. At 508, the operations can include distributing keying parameters by the 3GPP AAA element to each of the one or more second Wi-Fi APs and the operations can end. The keying parameters sent to a particular second Wi-Fi AP can include the MDID, a PMK-R1 key calculated for the particular second Wi-Fi AP and an S1KH-ID for the UE.

Figure 6A:
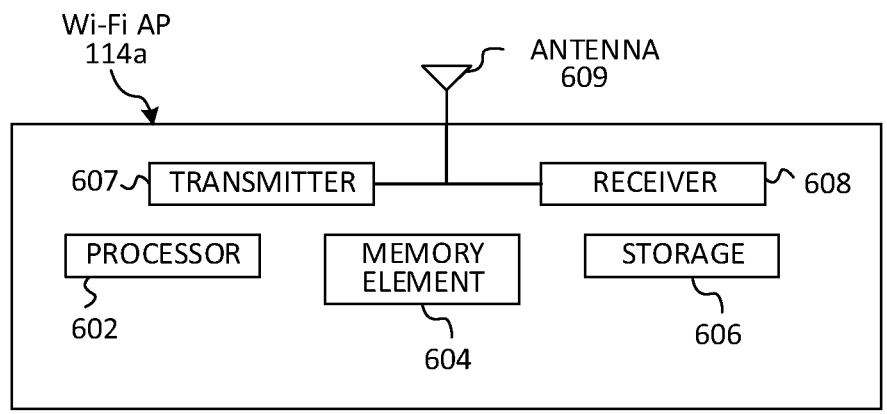
FIGS. 6A-6D are simplified block diagrams illustrating other example details that can be associated with various potential embodiments of the communication system.
Figure 6B:
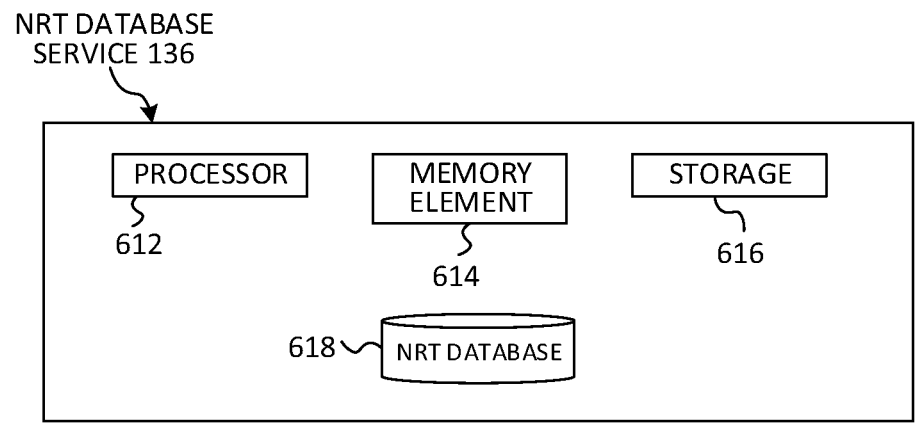
Figure 6C:
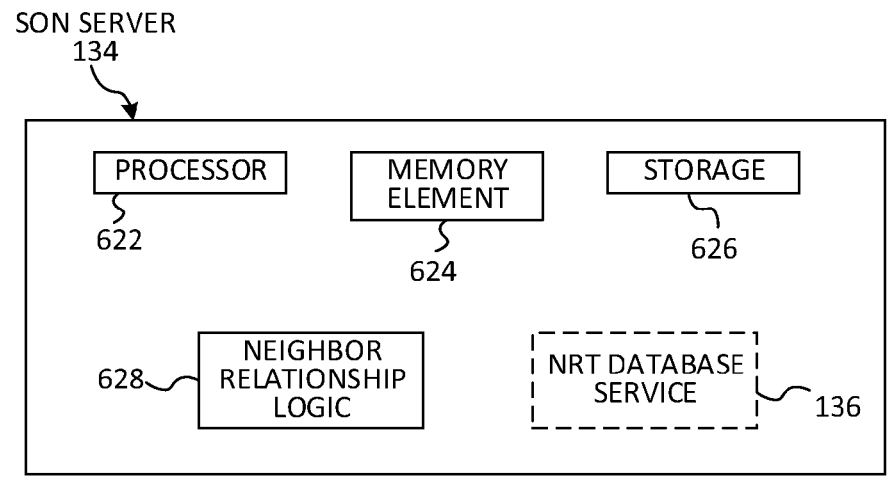
Figure 6D:
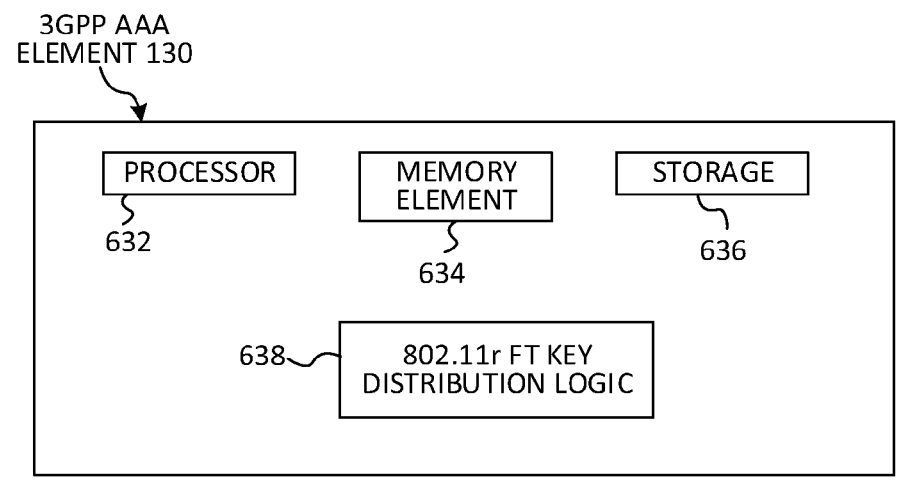

Turning to FIGS. 6A-6D, FIGS. 6A-6D are simplified block diagrams illustrating example details of various elements that can be associated with communication system 100 in accordance with one or more embodiments. FIG. 6A is a simplified block diagram illustrating example details that can be associated with Wi-Fi AP 114a or any other Wi-Fi AP that can be deployed in accordance with at least one embodiment of communication system 100. FIG. 6B is a simplified block diagram illustrating example details that can be associated with NRT database service 136 or any other NRT database or database service that can be deployed in accordance with at least one embodiment of communication system 100. FIG. 6C is a simplified block diagram illustrating example details that can be associated with SON server 134 or any other SON server that can be deployed in accordance with at least one embodiment of communication system 100. FIG. 6D is a simplified block diagram illustrating example details that can be associated with 3GPP AAA element 130 or any other 3GPP AAA element that can be deployed in accordance with at least one embodiment of communication system 100. Although not shown in FIGS. 6A-6D, it should be understood that any, UE, element, node, service, server, etc. as described herein can be configured with various interfaces to facilitate various messaging and operations as described herein.

Referring to FIG. 6A, FIG. 6A is a simplified block diagram illustrating example details associated with Wi-Fi AP 114a or any other Wi-Fi AP (e.g., Wi-Fi APs 114b-114c) that may be deployed in communication system 100 in accordance with at least one embodiment. As shown in FIG. 6A, Wi-Fi AP 114a can include at least one processor 602, at least one memory element 604, a storage 606, at least one transmitter 607, at least one receiver 608 and at least one antenna 609. In at least one embodiment, at least one processor 602 is at least one hardware processor configured to execute various tasks, operations and/or functions of Wi-Fi AP 114a as described herein and at least one memory element 604 is configured to store data associated with Wi-Fi AP 114a. In various embodiments, storage 606 for Wi-Fi AP 114a can be configured to store information and/or parameters associated with various operations as described herein including, but not limited to, storing a PMK-R1 key for a UE session; storing a PTK for a UE session; storing an MDID and an R1KH-ID for the Wi-Fi AP; storing signal strength measurements; combinations thereof or storing any other information and/or parameters as discussed herein. In at least one embodiment, at least one transmitter 607, at least one receiver 608 and at least one antenna 609 can operate in combination and/or with one or more other elements of Wi-Fi AP 114a to facilitate over the air communications with one or more UE for various operations as described herein.

Referring to FIG. 6B, FIG. 6B is a simplified block diagram illustrating example details associated with NRT database service 136 or any other NRT database server or service that may be deployed in communication system 100 in accordance with at least one embodiment. As shown in FIG. 6B, NRT database service 136 can include at least one processor 612, at least one memory element 614, a storage 616 and an NRT database 618. In at least one embodiment, at least one processor 612 is at least one hardware processor configured to execute various tasks, operations and/or functions of NRT database service 136 as described herein and at least one memory element 614 is configured to store data associated with NRT database service 136. In various embodiments, storage 616 for NRT database service 136 can be configured to store information and/or parameters associated with various operations as described herein including, but not limited to: providing temporary storage for an MSK and other information and/or parameters for a particular UE session in order to calculate (e.g., via a key server) at least one PMK-R1 key for at least one potential HO target neighbor Wi-Fi AP(s) of a particular source Wi-Fi AP; combinations thereof or storing any other information and/or parameters as discussed herein. In various embodiments, NRT database 618 can be configured to store one or more NRT(s) as populated and/or update via SON server 134, including an association of MDID and R1KH-ID for each Wi-Fi AP contained in each NRT. In some embodiments, memory element 614, storage 616 and/or NRT database 618 can be consolidated to overlap/exist in any suitable manner.

Referring to FIG. 6C, FIG. 6C is a simplified block diagram illustrating example details that can be associated with SON server 134 or any other SON server that can be deployed in accordance with at least one embodiment of communication system 100. As shown in FIG. 6C, SON server 134 can include at least one processor 622, at least one memory element 624, a storage 626 and neighbor relationship logic 628. In at least one embodiment, at least one processor 622 is at least one hardware processor configured to execute various tasks, operations and/or functions of SON server 134 as described herein and at least one memory element 624 is configured to store data associated with SON server 134. In various embodiments, storage 626 for SON server 134 can be configured to store information and/or parameters associated with various operations as described herein including, but not limited to: storing information and/or parameters reported to SON server from each Wi-Fi AP 114a-114c; storing neighbor relationship information for one or more NRT(s); combinations thereof or storing any other information and/or parameters as discussed herein. In at least one embodiment, neighbor relationship logic 628 can be configured to perform one or more operations, including but not limited to: determining neighbor relationships for one or more Wi-Fi APs belonging to a same mobility domain using information and/or parameters reported to SON server 134 from each Wi-Fi AP as described for various embodiments discussed herein. In at least one embodiment, NRT database service 136 can be configured for SON server 134.

Referring to FIG. 6D, FIG. 6D is a simplified block diagram illustrating example details that can be associated with 3GPP AAA element 130 or any other 3GPP AAA element (e.g., 3GPP V-AAA element 150) that can be deployed in accordance with at least one embodiment of communication system 100. As shown in FIG. 6D, 3GPP AAA element 130 can include at least one processor 632, at least one memory element 634, a storage 636 and 802.11r FT key distribution logic 638. In at least one embodiment, at least one processor 632 is at least one hardware processor configured to execute various tasks, operations and/or functions of 3GPP AAA element as described herein and at least one memory element 634 is configured to store data associated with 3GPP AAA element. In various embodiments, storage 636 for 3GPP AAA element 130 can be configured to store information and/or parameters associated with various operations as described herein including, but not limited to: storing subscription information and/or parameters for one or more Wi-Fi APs subscribed to a key distribution service configured for 3GPP AAA element 130; storing key information and/or parameters (e.g., PMK-R0 key, MSK, etc.) for a UE session; storing UE activity state for one or more mobility domains; combinations thereof or storing any other information and/or parameters as discussed herein.

In various embodiments, 802.11r FT key distribution logic 638 can be configured to perform one or more operations, including but not limited to: providing a key distribution service of 802.1X/EAP keying parameters for Wi-Fi APs subscribed to the service, which can include, but not be limited to: maintaining subscription parameters for Wi-Fi APs that have subscribed to the key distribution service; querying neighbor relations (e.g., via NRT database service 136) for a particular source Wi-Fi AP of a given mobility domain using the MDID and R1KH-ID of the source Wi-Fi AP to determine one or more potential HO target neighbor Wi-Fi APs; calculating keying parameters via key server 138 for the source Wi-Fi AP and one or more potential HO target neighbor Wi-Fi APs; determining whether a UE is mobile or stationary; maintaining UE activity state for one or more mobility domains; combinations thereof or any other operations as described for various embodiments discussed herein.

In regards to the internal structure associated with communication system 100, additionally each of UE 112, Wi-Fi AP 114b, Wi-Fi AP 114c, tunnel headend 120, ACS 132, and key server 138 may each also include a respective at least one processor, a respective at least one memory element and/or a respective at least one respective storage. Wi-Fi AP 114b and Wi-Fi AP 114c may each additionally include a respective at least one transmitter, a respective at least one receiver and a respective at least one antenna. Hence, appropriate software, hardware and/or algorithms are being provisioned in Wi-Fi APs 114a-114c, 3GPP AAA element 130, ACS 132, SON server 134, NRT database service 136 and/or key server 138 in order to facilitate various key distribution operations as described for various embodiments discussed herein to facilitate 802.11r FT in a residential/MDU Wi-Fi network environment. Note that in certain examples, certain databases or storage (e.g., for storing information associated with key distribution operations) can be consolidated with memory elements (or vice versa), or the storage can overlap/exist in any other suitable manner.

In one example implementation, Wi-Fi APs 114a-114c, tunnel headend 120, 3GPP AAA element 130, ACS 132, SON server 134, NRT database service 136 and/or key server 138 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate various key distribution operations as described for various embodiments discussed herein in a residential/MDU network environment (e.g., for networks such as those illustrated in FIGS. 1A-1B). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols, interfaces and/or standards, proprietary and/or non-proprietary that allow for the effective exchange of data or information.

In various embodiments, UE 112, Wi-Fi APs 114a-114c, tunnel headend 120, 3GPP AAA element 130, ACS 132, SON server 134, NRT database service 136 and/or key server 138 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112, Wi-Fi APs 114a-114c, tunnel headend 120, 3GPP AAA element 130, ACS 132, SON server 134, NRT database service 136 and/or key server 138 could be provided in any database, register, control list, cache, or storage structure: all of which can be referenced at any suitable timeframe. Any such storage options may be included within the broad term 'memory element' as used herein. Similarly, any of the potential processing elements, modules, controllers, logic and/or machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the key distribution operations as outlined herein may be implemented by logic encoded in one or more tangible media, which may be inclusive of non-transitory tangible media (e.g., embedded logic and/or encoding logic provided in an ASIC, in digital signal processing (DSP) instructions, software [potentially inclusive of object code and source code] to be executed by a processor, or other similar machine, etc.). In some of these instances, memory elements [as shown in FIGS. 6A-6D] can store data used for the operations described herein. This includes the memory elements being able to store software, logic, code, or processor instructions that are executed to carry out the activities described herein. A processor (e.g., a hardware processor) can execute any type of instructions associated with data to achieve the operations detailed herein. In one example, the processors [as shown in FIGS. 6A-6D] could transform an element or an article (e.g., data, information) from one state or thing to another state or thing. In another example, the activities outlined herein may be implemented with logic, which can include fixed logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
subscribing, by a server, a plurality of Wi-Fi access points belonging to a same mobility domain to a key distribution service;
generating, by the server, a neighbor relation table (NRT) for the plurality of Wi-Fi access points, wherein the NRT includes an R1 key holder identity (R1KH-ID) and a mobility domain identifier (MDID) for Wi-Fi access points of the plurality of access points that neighbor each other, wherein a given Wi-Fi access point is identified as neighboring a different Wi-Fi access point in the NRT when the given Wi-Fi access point is identified as a handover target for handover of a given user equipment from the different Wi-Fi access point to the given Wi-Fi access point;
receiving, at the server, a request from a user equipment to connect to a first Wi-Fi access point of the plurality of Wi-Fi access points belonging to the same mobility domain;

querying, by the server, the NRT with a given MDID associated with the first Wi-Fi Access point in the NRT;
determining, by the server, that the NRT includes the given MDID in association with a second Wi-Fi access point of the plurality of Wi-Fi access points belonging to the same mobility domain that neighbors the first Wi-Fi access point; and
distributing, by the server, keying parameters to the second Wi-Fi access point.

2. The method of claim 1, wherein the keying parameters are associated with 802.11r pairwise master key (PMK) keying parameters.

3. The method of claim 2, wherein the PMK keying parameters include one or more of:
a PMK-R1 key; and
an S1 key holder identity (S1KH-ID) for the user equipment.

4. The method of claim 1, wherein the subscribing is performed using at least one of:
Remote Authentication Dial-in User Service (RADIUS) messaging;
Diameter messaging;
Extensible Messaging and Presence Protocol (XMPP) messaging; and
Simple Object Access Protocol (SOAP) messaging.

5. The method of claim 1, wherein the subscribing further comprises:
communicating a subscription request message from each of the plurality of Wi-Fi access points to an 802.11r authenticator; and
communicating a subscription response message from the 802.11r authenticator to each of the plurality of Wi-Fi access points.

6. The method of claim 5, wherein the 802.11r authenticator is a 3rd Generation Partnership Program (3GPP) Authentication, Authorization and Accounting (AAA) element.

7. The method of claim 5, wherein, for each respective Wi-Fi access point of the plurality of Wi-Fi access points, a respective subscription request message for a respective Wi-Fi access point comprises:
a basic service set identifier (BSSID) for the respective Wi-Fi access point;
a particular MDID for the mobility domain to which respective Wi-Fi access point belongs; and
an a particular R1KH-ID of the respective Wi-Fi access point.

8. The method of claim 1, further comprising:
determining an activity state for the user equipment;
determining the one or more second Wi-Fi access points that neighbor the first Wi-Fi access point based on an NRT associated with the first Wi-Fi access point;
generating the keying parameters based on an R1KH-ID for each of the one or more second Wi-Fi access points; and
distributing the keying parameters to the one or more second Wi-Fi access points using the NRT associated with the first Wi-Fi access point.

9. A non-transitory memory element that stores program instructions that when executed by a processor, is operable to perform operations comprising:
subscribing to a key distribution service by a plurality of Wi-Fi access points belonging to a same mobility domain;
generating one or more neighbor relation tables (NRTs) for the plurality of Wi-Fi access points, wherein each NRT includes an R1 key holder identity (R1KH-ID) and a mobility domain identifier (MDID) for neighboring Wi-Fi access points of the plurality of access points that are deployed such that User Equipments are enabled to handover communications between the neighboring Wi-Fi access points;
receiving a request from a user equipment to connect to a first Wi-Fi access point of the plurality of Wi-Fi access points belonging to the same mobility domain;
querying the one or more NRTs with a given MDID associated with the first Wi-Fi access point;
determining a second Wi-Fi access point of the plurality of Wi-Fi access points that neighbors the first Wi-Fi access point included in the one or more NRTs as associated with the given MDID; and
distributing keying parameters to the second Wi-Fi access point.

10. The memory element of claim 9, wherein the keying parameters are associated with 802.11r pairwise master key (PMK) keying parameters.

11. The memory element of claim 10, wherein the PMK keying parameters include one or more of:
a PMK-RI key; and
an S1 key holder identity (SIKH-ID) for the user equipment.

12. The memory element of claim 9, wherein the subscribing is performed using at least one of:
Remote Authentication Dial-in User Service (RADIUS) messaging;
Diameter messaging;
Extensible Messaging and Presence Protocol (XMPP) messaging; and
Simple Object Access Protocol (SOAP) messaging.

13. The memory element of claim 9, wherein the subscribing further comprises:
communicating a subscription request message from each of the plurality of Wi-Fi access points to an 802.11r authenticator; and
communicating a subscription response message from the 802.11r authenticator to each of the plurality of Wi-Fi access points.

14. The memory element of claim 13, wherein, for each respective Wi-Fi access point of the plurality of Wi-Fi access points, a respective subscription request message for a respective Wi-Fi access point comprises:
a basic service set identifier (BSSID) for the respective Wi-Fi access point;
a particular MDID for the mobility domain to which respective Wi-Fi access point belongs; and
a particular R1KH-ID of the respective Wi-Fi access point.

15. The memory element of claim 9, the operations further comprising:
determining an activity state for the user equipment;
determining the one or more second Wi-Fi access points that neighbor the first Wi-Fi access point based on an NRT associated with the first Wi-Fi access point;
generating the keying parameters based on an R1KH-ID for each of the one or more second Wi-Fi access points; and
distributing the keying parameters to the one or more second Wi-Fi access points using the NRT associated with the first Wi-Fi access point.

16. A system comprising:
a memory element for storing data; and
a processor to execute instructions associated with the data that, when executed, the system is configured to:

subscribe to a key distribution service by a plurality of Wi-Fi access points belonging to a same mobility domain;

receive a request from a user equipment to connect to a first Wi-Fi access point of the plurality of Wi-Fi access points belonging to the same mobility domain;

generate a neighbor relation table (NRT) for the plurality of Wi-Fi access points, wherein the NRT includes an R1 key holder identity (R1KH-ID) and a mobility domain identifier (MDID) for neighboring Wi-Fi access points of the plurality of access points, wherein the neighboring Wi-Fi access points are configured to enable handover of the User Equipment between the neighboring Wi-Fi access points;

determine a second Wi-Fi access point of the plurality of Wi-Fi access points belonging to the same mobility domain that neighbors the first Wi-Fi access point, based at least in part on the NRT including the given MDID in association with the second Wi-Fi access point; and distribute keying parameters to the second Wi-Fi access point.

17. The system of claim 16, wherein the keying parameters are associated with 802.11r pairwise master key (PMK) keying parameters.

18. The system of claim 17, wherein the PMK keying parameters include one or more of:

a PMK-R1 key; and an S1 key holder identity (S1 KH-ID) for the user equipment.

* * * * *

UNITED STATES PATENT AND TRADEMARK OFFICE
CERTIFICATE OF CORRECTION

PATENT NO. : 10,165,608 B2  
APPLICATION NO. : 15/171126  
DATED : December 25, 2018  
INVENTOR(S) : Mark Grayson et al.

Page 1 of 1

It is certified that error appears in the above-identified patent and that said Letters Patent is hereby corrected as shown below:

On the Title Page

On the page 2, in Column 1, under "Other Publications", Line 20, delete "51" and insert -- S1 --, therefor.

In the Claims

In Column 27, Line 46, in Claim 7, delete "an a" and insert -- a --, therefor.

In Column 28, Line 23, in Claim 11, delete "PMK-RI" and insert -- PMK-R1 --, therefor.

Signed and Sealed this  
Twelfth Day of March, 2019

Andrei Iancu  
*Director of the United States Patent and Trademark Office*